(12) United States Patent
Sato

(10) Patent No.: US 10,259,085 B2
(45) Date of Patent: Apr. 16, 2019

(54) FRICTION STIR WELDING METHOD AND FRICTION STIR WELDING APPARATUS

(71) Applicant: MITSUBISHI HEAVY INDUSTRIES, LTD., Tokyo (JP)

(72) Inventor: Hiroaki Sato, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 67 days.

(21) Appl. No.: 15/321,523

(22) PCT Filed: Jun. 16, 2015

(86) PCT No.: PCT/JP2015/067247
§ 371 (c)(1),
(2) Date: Dec. 22, 2016

(87) PCT Pub. No.: WO2015/198910
PCT Pub. Date: Dec. 30, 2015

(65) Prior Publication Data
US 2017/0157720 A1 Jun. 8, 2017

(30) Foreign Application Priority Data
Jun. 25, 2014 (JP) ................................. 2014-130636

(51) Int. Cl.
*B23K 20/12* (2006.01)
*B23P 6/04* (2006.01)

(52) U.S. Cl.
CPC .............. *B23P 6/04* (2013.01); *B23K 20/12* (2013.01); *B23K 20/1255* (2013.01)

(58) Field of Classification Search
None
See application file for complete search history.

(56) References Cited

U.S. PATENT DOCUMENTS

| | | | |
|---|---|---|---|
| 6,367,681 B1 | 4/2002 | Waldron et al. | |
| 2004/0134971 A1* | 7/2004 | Narita | B23K 20/122 228/112.1 |

(Continued)

FOREIGN PATENT DOCUMENTS

| | | | |
|---|---|---|---|
| CN | 102601516 A | * | 7/2012 |
| CN | 103008896 | | 4/2013 |

(Continued)

OTHER PUBLICATIONS

International Search Report dated Sep. 15, 2015 in corresponding International Application No. PCT/JP2015/067247.

(Continued)

*Primary Examiner* — Devang R Patel
(74) *Attorney, Agent, or Firm* — Wenderoth, Lind & Ponack, L.L.P.

(57) ABSTRACT

A friction stir welding method includes a first friction stir welding process of forming a first stirring region in a beveled part, by moving a first rotary tool disposed on an upper side in a thickness direction across the beveled part, while rotating the first rotary tool; and a second friction stir welding process of forming a second stirring region in the beveled part, by moving a second rotary tool disposed on a lower side in the thickness direction across the beveled part, while rotating the second rotary tool, simultaneously with the first friction stir welding process or after performing the first friction stir welding process.

10 Claims, 12 Drawing Sheets

(56) References Cited

U.S. PATENT DOCUMENTS

| | | | |
|---|---|---|---|
| 2005/0035179 A1 | 2/2005 | Forrest et al. | |
| 2008/0302154 A1 | 12/2008 | Forrest et al. | |
| 2014/0069984 A1 | 3/2014 | Mialhe et al. | |
| 2016/0167161 A1* | 6/2016 | Sato .................. | B23K 20/1255 228/114.5 |

FOREIGN PATENT DOCUMENTS

| | | | |
|---|---|---|---|
| JP | 11-314183 | 11/1999 | |
| JP | 11-320127 | 11/1999 | |
| JP | 2001-25886 | 1/2001 | |
| JP | 2002-263865 | 9/2002 | |
| JP | 2005-59101 | 3/2005 | |
| JP | 2009-220176 | 10/2009 | |
| JP | 4838385 | 12/2011 | |
| JP | 4838389 | 12/2011 | |
| JP | 2012-40583 | 3/2012 | |
| JP | 2014-50884 | 3/2014 | |
| WO | 2011/024320 | 3/2011 | |
| WO | WO-2011061826 A1 * | 5/2011 | ......... B23K 20/1255 |
| WO | 2012/029175 | 3/2012 | |

OTHER PUBLICATIONS

Office Action dated Aug. 21, 2018 in Chinese Application No. 201580034043.4, with English translation.

\* cited by examiner

FRICTION STIR WELDING METHOD AND FRICTION STIR WELDING APPARATUS

FIELD

The present invention relates to a friction stir welding method and a friction stir welding apparatus for welding a welded part by friction stir welding.

BACKGROUND

Conventionally, a friction stir welding apparatus has been known in which upper and lower rotary tools inserted from a front surface side and a back surface side of a welding part of a metal plate are used to weld the metal plate by friction stirring with the upper and lower rotary tools (see JP 4838385 B2). In the friction stir welding apparatus, the upper and lower rotary tools have a cylindrical tool body, and a probe attached to the front end of the tool body. A shoulder part is formed around an attachment portion of the probe at the front end of the tool body. The friction stir welding apparatus performs the friction stir welding in a state of imparting a predetermined gap between the front ends of the probes of the upper and lower rotary tools.

Further, a friction stir welding apparatus has been known in which first and second rotary tools disposed on the front surface side and the back surface side of the welding part of the metal plate to face each other are used to weld the metal plate by friction stirring with the first and second rotary tools (see, for example, JP 4838389 B1). In the friction stir welding apparatus, one of the first and second rotary tools has a tool body having a shoulder part formed at a front end thereof and a probe (protruding portion) formed to protrude from the tool body, and the other thereof has a tool body having a shoulder part formed at a front end thereof and a recessed portion which stores the front end of the probe. The friction stir welding apparatus performs the friction stir welding in a state in which the protruding portion of one rotary tool is inserted into the recessed portion of the other rotary tool.

TECHNICAL PROBLEM

However, in the friction stir welding apparatus described in JP 4838385 B2, a predetermined gap is provided between the front ends of the probes of the upper and lower rotary tools. Therefore, when the thickness of the metal plate becomes thicker, since an absolute value of tolerance permitted by the material specification increases, the gap increases, and there is a possibility that a welding defect part (non-welded part) called a kissing bond is generated. Especially, in materials such as 2000 series or 7000 series aluminum alloys with poor flow characteristics at a welding temperature, an amount of allowable gap is small, and such a defect is likely to occur. Further, when the metal plate is deformed plastically after welding, there is a possibility that damage such as cracks due to the welding defect part may occur.

Further, in the friction stir welding apparatus described in JP 4838389 B1, the probes are provided across the thickness direction of the metal plate. Therefore, when the thickness of the metal plate increases, it is necessary to lengthen the length of the probes. When lengthening the length of the probes, since the bending moment applied to the probes increases, the load on the tool increases and there is a high possibility of leading to damage to the tools. Further, since there is a need to increase the diameter of the probes when the apparatus is configured to be able to withstand the load applied to the tools, it is necessary to make the rotary tools large, and along with this, an apparatus configuration such as a shaft or a motor for driving the tools increases.

SUMMARY

Therefore, an object of the present invention is to provide a friction stir welding method and a friction stir welding apparatus capable of suitably performing the friction stir welding of the welded parts, by suppressing the occurrence of welding defect part, while suppressing the load applied to the rotary tool, even when the thickness of the welded parts of the metallic material changes.

SOLUTION TO PROBLEM

A friction stir welding method of the present invention includes a first friction stir welding process of forming a first stirring region in a welded part of a metallic material, by moving a first rotary tool in a first advancing direction while rotating the first rotary tool, the first rotary tool being disposed on one side of the welded part in a thickness direction across the welded part, and a second friction stir welding process of forming a second stirring region in the welded part, by moving a second rotary tool in a second advancing direction while rotating the second rotary tool, simultaneously with the first friction stir welding process or after performing the first friction stir welding process, the second rotary tool being disposed on the other side in the thickness direction across the welded part. The first stirring region is a region which reaches the interior of the welded part from the one side of the welded part in the thickness direction, the second stirring region is a region which reaches the interior of the welded part from the other side of the welded part in the thickness direction, and the first stirring region and the second stirring region overlap each other inside the welded part in the thickness direction.

According to this configuration, it is possible to form the first stirring region in the welded part by the first friction stir welding process and to form the second stirring region in the welded part by the second friction stir welding process. Further, since the first stirring region and the second stirring region thus formed overlap each other in the thickness direction of the welded part, it is possible to perform the friction stirring over the entire region in the thickness direction. Therefore, since no predetermined gap is formed between the first rotary tool and the second rotary tool, it is possible to suppress the occurrence of the welding defect part. Further, even if the thickness of the welded part of the metallic material changes, the overlapping region in which the first stirring region and the second stirring region overlap each other may change in the thickness direction. Accordingly, because it is not necessary to change the lengths of the first rotary tool and the second rotary tool, it is possible to suppress an increase in load on the rotary tool. From the above, it is possible to suppress the occurrence of the welding defect part and suitably perform the friction stir welding of the welded part, while suppressing the load applied to the rotary tool, even if the thickness of the welded part of the metallic material varies.

Further, the welded part is preferably a beveled part formed by making a pair of metallic materials butt against each other, the beveled part preferably forms a welding line extending from a welding start point toward a welding end point, and the first rotary tool and the second rotary tool preferably move on the welding line.

According to this configuration, the first rotary tool and the second rotary tool can move on the welding line to form the first stirring region and the second stirring region. Therefore, because the first stirring region and the second stirring region can be formed over the entire region in the thickness direction on the butting surface in which the pair of metallic materials is butted on each other, the occurrence of the welding defect part can be suppressed.

Further, when performing the second friction stir welding process simultaneously with the first friction stir welding process, the first advancing direction and the second advancing direction are preferably in the same advancing direction, the first rotary tool is preferably formed to have a length in the thickness direction which reaches the interior of the welded part from one side of the welded part, the second rotary tool is preferably formed to have a length in the thickness direction which reaches the interior of the welded part from the other side of the welded part, and the first rotary tool and the second rotary tool preferably overlap each other inside the welded part in the thickness direction and are preferably disposed to be at least shifted to front and rear in the advancing direction.

According to this configuration, when the first friction stir welding process and the second friction stir welding process are performed at the same time, by disposing the first rotary tool and the second rotary tool to be shifted to the front and rear in the advancing direction, it is possible to suppress physical interference between the first rotary tool and the second rotary tool. Further, by disposing the first rotary tool and the second rotary tool to overlap each other in the thickness direction, the first stirring region and the second stirring region formed by the first rotary tool and the second rotary tool can be made to overlap each other in the thickness direction. Here, for example, when the first rotary tool and the second rotary tool have the same length, the lengths of the first rotary tool and the second rotary tool are longer than half of the thickness of the welded part.

Further, the first rotary tool and the second rotary tool are preferably disposed to be shifted to left and right in a width direction orthogonal to the advancing direction, in an orthogonal plane orthogonal to the thickness direction.

According to this configuration, as the first rotary tool and the second rotary tool are shifted to the left and right in the width direction, the distance between the first rotary tool and the second rotary tool increases. Accordingly, it is possible to bring the first rotary tool and the second rotary tool closer to the advancing direction. Therefore, by disposing the first rotary tool and the second rotary tool to be shifted to the left and right in the width direction, it is possible to more preferably suppress the physical interference between the first rotary tool and the second rotary tool.

Further, the first rotary tool preferably has a first tool body having a first shoulder part which is in contact with one surface of the welded part, and a first probe protruding from the first tool body toward the second rotary tool, the second rotary tool preferably has a second tool body having a second shoulder part which is in contact with the other surface of the welded part, and a second probe protruding from the second tool body toward the first rotary tool, and the first rotary tool and the second rotary tool are preferably disposed to be shifted in a range in which at least a part of the first shoulder part and the second shoulder part overlap each other in the thickness direction.

According to this configuration, since the first rotary tool and the second rotary tool can impart the reaction force to each other, it is possible to suitably perform the friction stirring of the welded part, while maintaining the position of the welded part in the thickness direction at a predetermined position.

Further, the first rotary tool rotates about a first rotary axis, an outer circumferential surface of the first shoulder part is a circumferential surface, the first probe has a circular first front end surface on a front end side that is the second rotary tool side, the second rotary tool rotates about a second rotary axis, an outer circumferential surface of the second shoulder part is a circumferential surface, the second probe has a circular second front end surface on a front end side that is the first rotary tool side, when a distance between the first rotary axis and the second rotary axis is set as L, a diameter of the first shoulder part is set as D1, a diameter of the first front end surface is set as d1, a diameter of the second shoulder part is set as D2, and a diameter of the second front end surface is set as d2, the first rotary tool and the second rotary tool are preferably disposed to be shifted so that the distance L is in the range of $(d1/2+d2/2)<L<(D1/2+d2/2)$ in the case of $(D1/2+d2/2) \le (D2/2+d1/2)$, and the first rotary tool and the second rotary tool are preferably disposed to be shifted so that the distance L is in the range of $(d1/2+d2/2)<L<(D2/2+d1/2)$ in the case of $(D1/2+d2/2) \ge (D2/2+d1/2)$.

According to this configuration, by setting the distance L between the first rotary tool and the second rotary tool within the above range, it is possible to more reliably impart the reaction force to each other.

Further, when the first rotary tool and the second rotary tool are viewed from one side in the thickness direction, the rotary direction of the first rotary tool and the rotary direction of the second rotary tool are preferably opposite to each other.

According to this configuration, the load direction imparted to the welded part on the front side in the advancing direction of the first rotary tool is opposite to the load direction imparted to the welded part on the front side in the advancing direction of the second rotary tool. For this reason, since it is possible to cancel out the load applied to the welded part by the first rotary tool and the load applied to the welded part by the second rotary tool, it is possible to suppress the load from being biased against the welded part. Further, the flow direction of the metallic material to be frictionally stirred can be set to one direction between the first rotary tool and the second rotary tool. Therefore, the metallic material to be frictionally stirred can be allowed to smoothly flow.

Further, the first rotary tool and the second rotary tool preferably have the same shape.

According to this configuration, since the conditions of friction stirring performed by the first rotary tool and the second rotary tool can be set to substantially the same conditions on both sides of the welded part in the thickness direction, the friction stir welding of the welded part can be suitably performed.

When performing the second friction stir welding process after performing the first friction stir welding process, in the first friction stir welding process, a first reaction force rotary tool provided on the opposite side of the first rotary tool across the welded part is disposed, the first reaction force rotary tool having a first abutting surface which abuts against the other side of the welded part in the thickness direction, and imparting a reaction force to the first rotary tool, and in the second friction stir welding process, a second reaction force rotary tool provided on the opposite side of the second rotary tool across the welded part is disposed, the second reaction force rotary tool having a second abutting surface which abuts against one side of the welded part in the thickness direction and imparting a reaction force to the second rotary tool.

According to this configuration, in the first friction stir welding process, the first stirring region can be formed, using the first rotary tool and the first reaction force rotary tool. At this time, by imparting the reaction force to the first rotary tool, the first reaction force rotary tool can suppress the positional variation of the welded part in the thickness direction, and can impart the heat input due to the rotation to the welded part. Further, in the second friction stir welding process, the second stirring region can be formed, using the second rotary tool and the second reaction force rotary tool. At this time, similarly to the first friction stir welding process, the second reaction force rotary tool can suppress the positional variation of the welded part in the thickness direction by imparting the reaction force to the second rotary tool, and can impart the heat input due to the rotation to the welded part. Since the first stirring region and the second stirring region thus formed overlap each other in the thickness direction of the welded part, friction stirring can be performed over the entire region in the thickness direction. Therefore, since no predetermined gap is formed between the first rotary tool and the second rotary tool, it is possible to suppress the occurrence of the welding defect part. Further, even if the thickness of the welded part of the metallic material changes, the overlapping region in which the first stirring region and the second stirring region overlap each other may change in the thickness direction. Accordingly, since it is not necessary to change the lengths of the first rotary tool and the second rotary tool, it is possible to suppress an increase in load on the rotary tools. From the above, it is possible to suppress the occurrence of the welding defect part and suitably perform the friction stir welding of the welded part, while suppressing the load applied to the rotary tool, even if the thickness of the welded part of the metallic material varies.

At least one of the first abutting surface of the first reaction force rotary tool and the second abutting surface of the second reaction force rotary tool is preferably a flat surface.

According to this configuration, since the first abutting surface and the second abutting surface are flat surfaces at the time of friction stirring, it is possible to reduce the force required for the rotation of the first reaction force rotary tool and the second reaction force rotary tool having the flat surface. Further, in the initial stage of friction stir welding, with respect to the first reaction force rotary tool and the second reaction force rotary tool having the flat surface, there is no need to perform an inserting process of inserting the protruding portion formed on the rotary tool into the welded part and a pulling-out process. Thus, it is possible to simplify the welding operation process. Also, in general, in the friction stir welding, although a backing metal is applied to the opposite side of the rotary tool across the welded part, unlike the case of using the backing metal, by controlling the positions of the respective rotary tools and the respective reaction force rotary tools in accordance with the unevenness of the welded part, it is possible to reliably bring the flat surfaces of each reaction force rotary tool into contact with the welded part. Further, since it is possible to receive the reaction force of each rotary tool of the opposite side accordingly, it is possible to suitably perform the friction stir welding of the welded part. Furthermore, unlike the case of using the backing metal, since the contact area of each reaction force rotary tool to the welded part is limited, and there is also heat input due to the rotation of each reaction force rotary tool, it is possible to reduce the heat loss of the welded part to the reaction force rotary tool side.

Further, a protruding portion is preferably formed on at least one of the first abutting surface of the first reaction force rotary tool and the second abutting surface of the second reaction force rotary tool.

According to this configuration, at the time of friction stirring, the surface of the welded part on the side against which the first abutting surface and the second abutting surface abut can be subjected to the friction stir welding by the protruding portion. Therefore, for example, when performing the second friction stir welding after the first friction stir welding, prior to friction stirring performed by the second rotary tool, it is possible to temporally weld the other surface of the welded part by the first reaction force rotary tool. Therefore, in a case where the welded part is the beveled part, since it is possible to suppress the opening of the beveled part by the tack welding, it is possible to suitably frictionally stir the welded part with the second rotary tool.

After performing the first friction stir welding process, the second friction stir welding process is preferably performed in a state of keeping the position of the metallic material.

According to this configuration, it is possible to maintain the position of the metallic material, without inverting the position of the metallic material. Therefore, it is possible to perform the first friction stir welding process and the second friction stir welding process, without performing the inverting operation of the metallic material.

Further, the friction stir welding method preferably further includes, after performing the first friction stir welding process and before performing the second friction stir welding process, a tool inverting process of replacing the positions of the first rotary tool and the first reaction force rotary tool with each other to set the first rotary tool as the second rotary tool and set the first reaction force rotary tool as the second reaction force rotary tool.

According to this configuration, by performing the tool inverting process, the first rotary tool can be used as the second rotary tool, and the first reaction force rotary tool can be used as the second reaction force rotary tool. Therefore, it is possible to execute the first friction stir welding process and the second friction stir welding process, by inverting the positions of the first rotary tool and the first reaction force rotary tool, without inverting the position of the metallic material.

The friction stir welding method preferably further includes, after performing the first friction stir welding process and before performing the second friction stir welding process, a material inverting process of inverting the position of the metallic material in the thickness direction to set the first rotary tool as the second rotary tool and set the first reaction force rotary tool as the second reaction force rotary tool.

According to this configuration, by performing the material inverting process, the first rotary tool can be used as the second rotary tool, and the first reaction force rotary tool can be used as the second reaction force rotary tool. Therefore, it is possible to execute the first friction stir welding process and the second friction stir welding process, by inverting the position of the metallic material, without inverting the positions of the first rotary tool and the first reaction force rotary tool.

When the thickness direction of the welded part is a vertical direction, in the first friction stir welding process, the first rotary tool is preferably disposed on the upper side of the welded part.

According to this configuration, after the first stirring region is formed on the upper side of the welded part, the second stirring region can be formed on the lower side of the welded part. Therefore, in the first friction stir welding process, the region of the upper side of the welded part becomes the first stirring region, and the region on the lower side of the welded part becomes the non-welded region in which no friction stir welding is performed. Thus, it is possible to suppress foreign matters entering the non-welded region from the upper side to the lower side, by the first stirring region.

The first advancing direction and the second advancing direction are preferably opposite to each other.

According to this configuration, the welding end points of the first rotary tool and the first reaction force rotary tool can be used as the welding start points of the second rotary tool and the second reaction force rotary tool. Therefore, it is possible to reduce the movement of various rotary tools.

The first advancing direction and the second advancing direction are preferably the same direction.

According to this configuration, heat input to the welded part in the first friction stir welding process and heat input to the welded part in the second friction stir welding process can be performed in the same advancing direction. For this reason, since it is possible to set the same heat input conditions in the welded part of the first friction stir welding process and the second friction stir welding process, after performing the first friction stir welding process, the second friction stir welding process can be promptly executed.

The first rotary tool has a first tool body having a first shoulder part being in contact with one surface of the welded part, a first insertion hole formed to penetrate the first tool body along a first rotary axis of the first rotary tool, and a first probe pin which is inserted through the first insertion hole, is movable in an axial direction of the first rotary axis and protrudes toward the first reaction force rotary tool from the first tool body, the first reaction force rotary tool has a second tool body having a second shoulder part being in contact with the other surface of the welded part, a second insertion hole formed to penetrate the second tool body along a second rotary axis of the first reaction force rotary tool, and a second probe pin which is inserted through the second insertion hole, is movable in the axial direction of the second rotary axis and protrudes toward the first rotary tool from the second tool body, in the first friction stir welding process, the first rotary tool and the first reaction force rotary tool are disposed such that the first rotary axis and the second rotary axis are coaxial with each other, the first probe pin and the second probe pin are opposed to each other with a predetermined gap therebetween, and a protruding length of the first probe pin is set to be longer than the length of the second probe pin, and the method preferably further includes, after performing the first friction stir welding process, a replacing process of setting the first rotary tool as the second reaction force rotary tool and setting the first reaction force rotary tool as the second rotary tool, by displacing the protruding length of the first probe pin of the first rotary tool and the protruding length of the second probe pin of the first reaction force rotary tool to set the protruding length of the second probe pin to be longer than the first probe pin.

According to this configuration, by displacing each of the protruding length of the first probe pin and the protruding length of the second probe pin in the replacing process, the first rotary tool can be used as the second reaction force rotary tool, and the first reaction force rotary tool can be used as the second rotary tool.

When repairing a welding defect part generated in a welding part of the metallic material formed by friction stir welding of the welded part, the welding part is repaired, by moving a repairing rotary tool disposed on one side of the welding part in the thickness direction across the welding part, and a reaction force rotary tool disposed on the other side in the thickness direction across the welding part to impart a reaction force to the repairing rotary tool in a predetermined advancing direction, while rotating the repairing rotary tool and the reaction force rotary tool, and the length of the repairing rotary tool in the thickness direction is preferably a length which reaches the interior of the welding part from one side of the welding part and covers the welding defect part.

According to this configuration, it is possible to repair the welding defect part generated in the welding part, using the repairing rotary tool and the reaction force rotary tool. At this time, by imparting the reaction force to the repairing rotary tool, the reaction force rotary tool can suppress the positional variation of the welding part in the thickness direction and can impart the heat input due to the rotation to the welding part.

A friction stir welding apparatus of the present invention includes a first rotary tool which is disposed on one side of a welded part of a metallic material in a thickness direction across the welded part and has a length reaching the interior of the welded part from one side of the welded part; and a second rotary tool which is disposed on the other side in the thickness direction across the welded part and has a length reaching the interior of the welded part from the other side of the welded part, wherein the first rotary tool forms a first stirring region in the welded part, by moving in a first advancing direction while rotating, the second rotary tool forms a second stirring region in the welded part, by moving in a second advancing direction, while rotating, and the first stirring region and the second stirring region overlap each other inside the welded part in the thickness direction.

According to this configuration, the first stirring region can be formed in the welded part by the first rotary tool, and the second stirring region can be formed in the welded part by the second rotary tool. Since the first stirring region and the second stirring region thus formed overlap each other in the thickness direction of the welded part, friction stirring can be performed over the entire region in the thickness direction. Therefore, since no predetermined gap is formed between the first rotary tool and the second rotary tool, it is possible to suppress the occurrence of the welding defect part. Further, even if the thickness of the welded part of the metallic material changes, the overlapping region in which the first stirring region and the second stirring region overlap each other may change in the thickness direction. Thus, since it is not necessary to change the lengths of the first rotary tool and the second rotary tool, it is possible to suppress an increase in load on the rotary tool. From the above, it is possible to suppress the occurrence of the welding defect part and suitably perform the friction stir welding of the welded part, while suppressing the load applied to the rotary tool, even if the thickness of the welded part of the metallic material varies.

Further, the first advancing direction and the second advancing direction are in the same advancing direction, the first rotary tool and the second rotary tool move in the advancing direction to perform the friction stir welding, while rotating with both sides of the welded part in the thickness direction interposed therebetween, and the first rotary tool and the second rotary tool preferably overlap each other inside the welded part in the thickness direction and are preferably disposed to be shifted to at least front and rear in the advancing direction.

According to this configuration, it is possible to form the first stirring region and the second stirring region substantially at the same time to overlap each other in the thickness direction, by rotating the first rotary tool and the second rotary tool, while sandwiching them from both sides of the welded part. At this time, it is possible to suppress the physical interference between the first rotary tool and the second rotary tool, by disposing the first rotary tool and the second rotary tool to be shifted to front and rear in the advancing direction.

The friction stir welding apparatus further includes a first reaction force rotary tool which is provided on the opposite side of the first rotary tool across the welded part and imparts a reaction force to the first rotary tool; and a second reaction force rotary tool which is provided on the opposite side of the second rotary tool across the welded part and imparts a reaction force to the second rotary tool, wherein the first rotary tool and the first reaction force rotary tool move in a predetermined advancing direction to perform first friction stir welding, while rotating with both sides of the welded part in the thickness direction interposed therebetween, and after performing the first friction stir welding, the second rotary tool and the second reaction force rotary tool may move in a predetermined advancing direction to perform second friction stir welding, while rotating with both sides of the welded part in the thickness direction interposed therebetween.

According to this configuration, in the first friction stir welding, the first stirring region can be formed by rotating the first rotary tool and the first reaction force rotary tool, while interposing them from both sides of the welded part. At this time, by imparting the reaction force to the first rotary tool, the first reaction force rotary tool can suppress the positional variation of the welded part in the thickness direction and can impart the heat input due to the rotation to the welded part. In the second friction stir welding, the second stirring region can be formed, by rotating the second rotary tool and the second reaction force rotary tool, while interposing them from both sides of the welded part. At this time, similarly to the first friction stir welding, by imparting the reaction force to the second rotary tool, the second reaction force rotary tool can suppress the positional variation of the welded part in the thickness direction and can impart the heat input due to rotation to the welded part.

The friction stir welding apparatus further includes a first reaction force rotary tool which is provided on the opposite side of the first rotary tool across the welded part and imparts a reaction force to the first rotary tool; a second reaction force rotary tool which is provided on the opposite side of the second rotary tool across the welded part and imparts a reaction force to the second rotary tool; and an inverting mechanism which inverts the positions of the first rotary tool and the first reaction force rotary tool to make the first rotary tool function as the second rotary tool and make the first reaction force rotary tool as the second reaction force rotary tool, wherein the first rotary tool before inversion and the second rotary tool after inversion are disposed to overlap each other inside the welded part in the thickness direction, the first rotary tool and the first reaction force rotary tool before inversion move in a predetermined advancing direction to perform first friction stir welding, while rotating with both sides of the welded part in the thickness direction interposed therebetween, after performing the first friction stir welding, the inverting mechanism inverts the positions of the first rotary tool and the first reaction force rotary tool, and the second rotary tool and the second reaction force rotary tool after inversion preferably move in a predetermined advancing direction to perform second friction stir welding, while rotating with the both sides of the welded part in the thickness direction interposed therebetween.

According to this configuration, by inverting the positions of the first rotary tool and the first reaction force rotary tool by the inverting mechanism, the first rotary tool can be used as the second rotary tool, and the first reaction force rotary tool can be used as the second reaction force rotary tool. For this reason, it is possible to perform the first friction stir welding and the second friction stir welding, by inverting the positions of the first rotary tool and the first reaction force rotary tool, without inverting the position of the metallic material.

The friction stir welding apparatus further includes, when repairing a welding defect part generated in the welding part of the metallic material formed by friction stir welding of the welded part, a repairing rotary tool which is disposed on one side of the welding part in the thickness direction across the welding part, and has a length which reaches the interior of the welding part from one side of the welding part and covers the welding defect part, and a reaction force rotary tool which is disposed on the other side in the thickness direction across the welding part and imparts a reaction force to the repairing rotary tool, wherein the repairing rotary tool and the reaction force rotary tool move in a predetermined advancing direction to repair the welding part, while rotating with both sides of the welding part in the thickness direction interposed therebetween.

According to this configuration, the welding defect part generated in the welding part can be repaired, using the repairing rotary tool and the reaction force rotary tool. At this time, by applying a reaction force to the repairing rotary tool, the reaction force rotary tool can suppress the positional variation of the welding part in the thickness direction and can impart the heat input due to the rotation to the welding part.

DESCRIPTION OF EMBODIMENTS

Embodiments of the present invention will be described in detail below with reference to the drawings. The present invention is not limited by the embodiments. In addition, the constituent elements in the following examples include those which can be easily replaced by those skilled in the art or are substantially the same. Further, the constituent elements described below can be appropriately combined with each other, and when there is a plurality of embodiments, it is also possible to combine the respective embodiments.

First Embodiment

Figure 1:
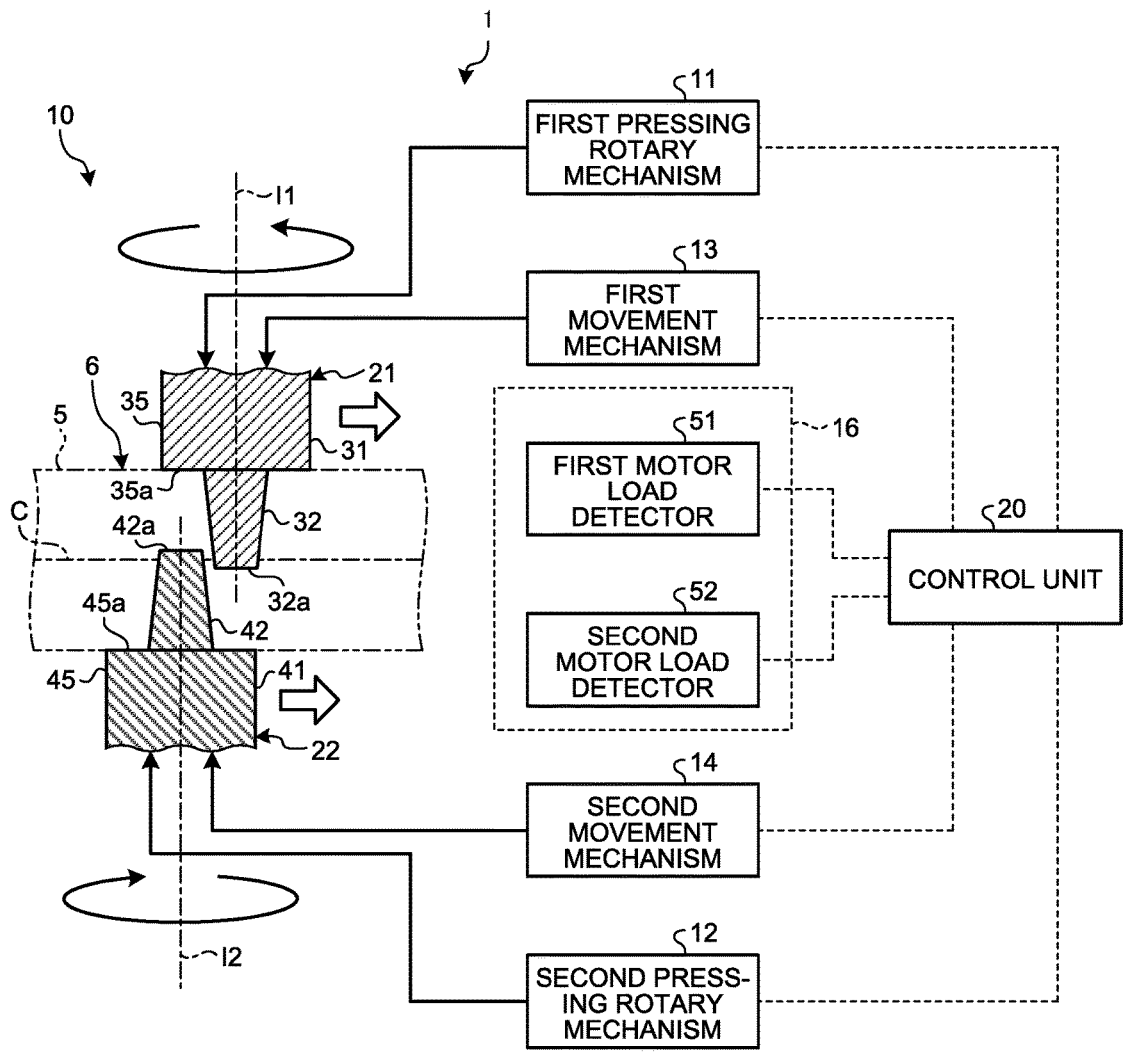
FIG. 1 is a schematic configuration diagram schematically illustrating a friction stir welding apparatus according to a first embodiment.
Figure 2:
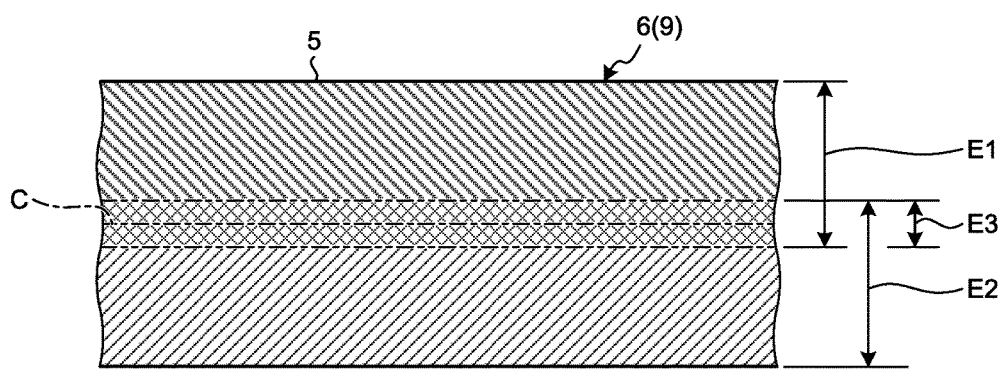
FIG. 2 is an explanatory view relating to a first stirring region and a second stirring region.
Figure 3:
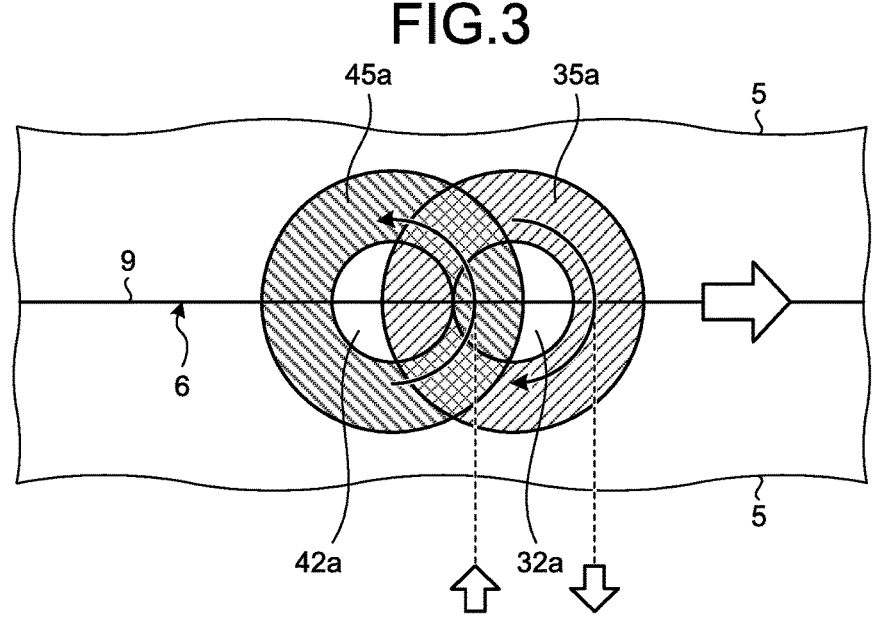
FIG. 3 is a plan view illustrating a first shoulder surface and a second shoulder surface.
Figure 4:
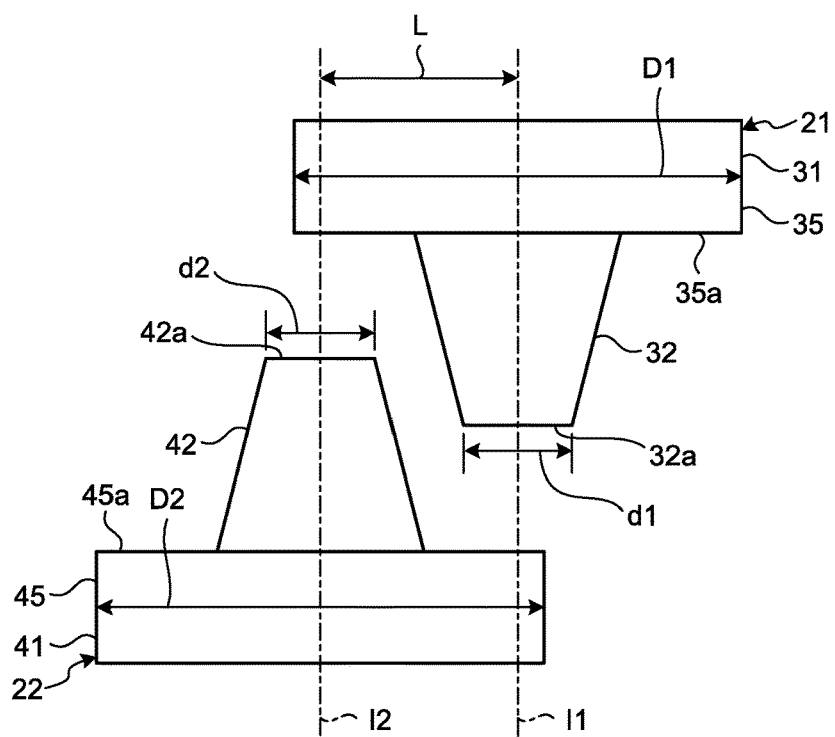
FIG. 4 is a side view illustrating the shapes of the first shoulder part and the second shoulder part.
Figure 5:
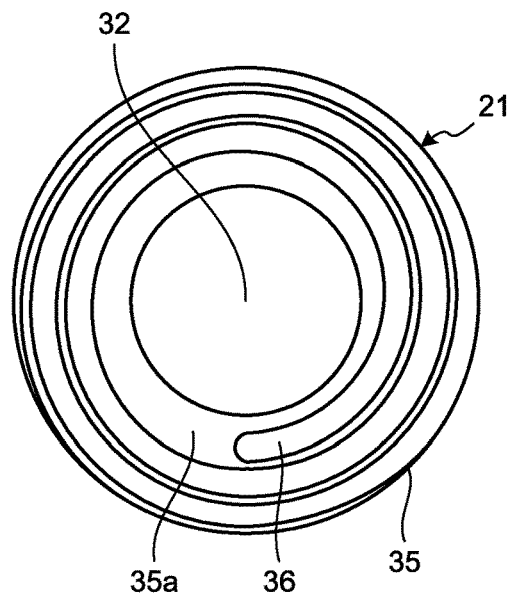
FIG. 5 is a plan view illustrating an example of a shape of the first shoulder part.
Figure 6:
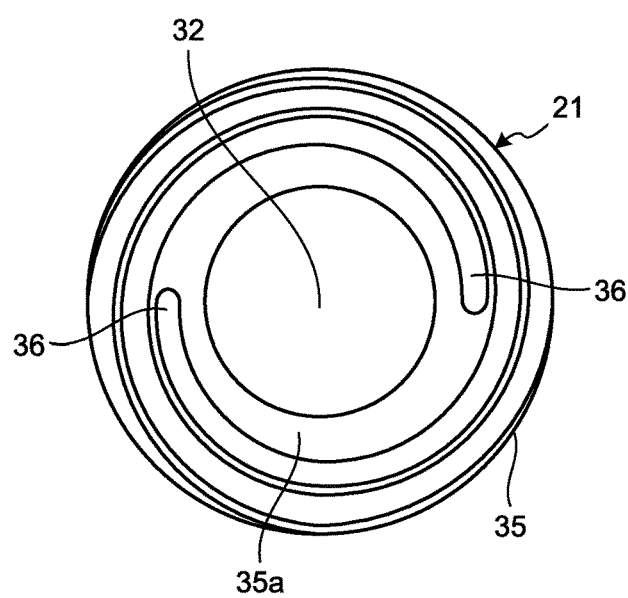
FIG. 6 is a plan view illustrating an example of a shape of the first shoulder part.
Figure 7:
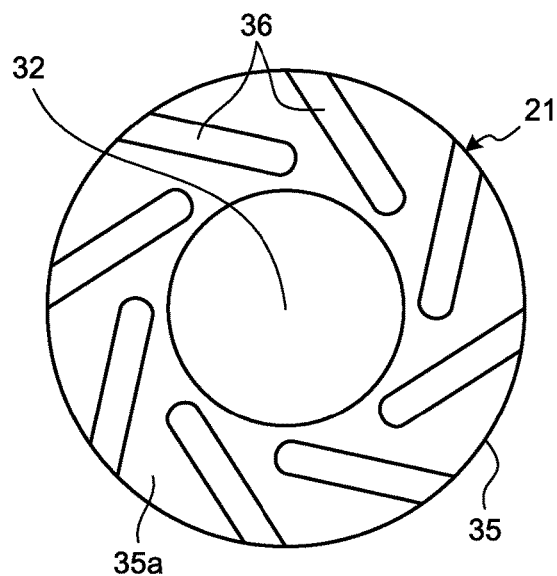
FIG. 7 is a plan view illustrating an example of a shape of the first shoulder part.
Figure 8:
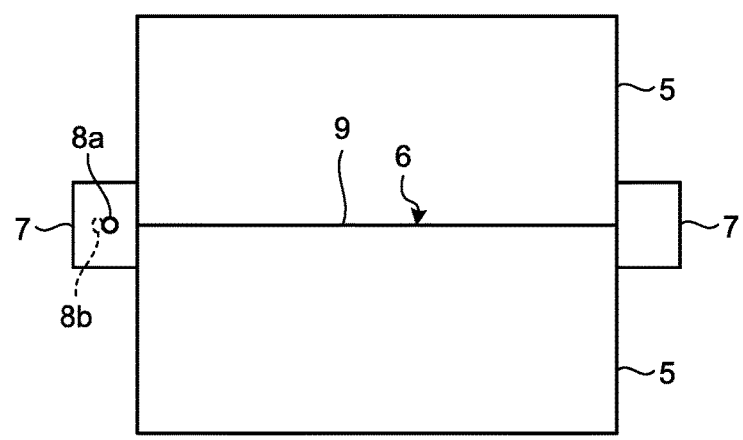
FIG. 8 is an explanatory view illustrating an example of a metal plate prior to friction stir welding.
Figure 9:
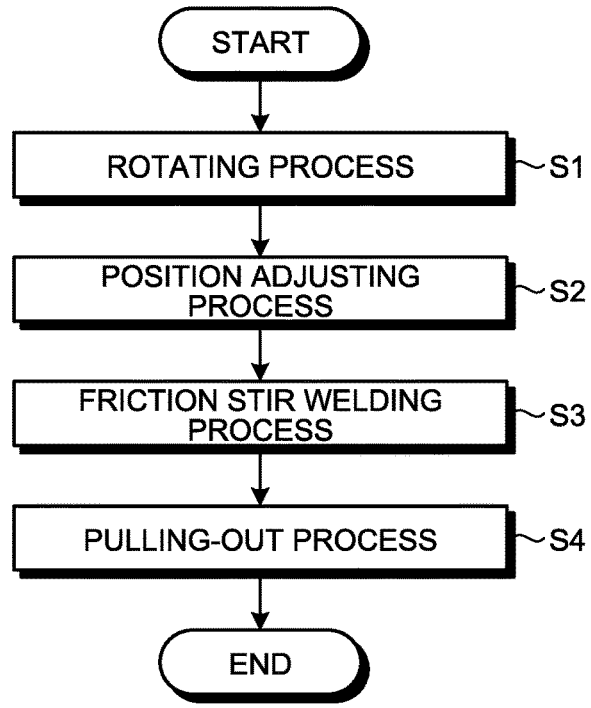
FIG. 9 is a flowchart of a friction stir welding method according to the first embodiment.

FIG. 1 is a schematic configuration diagram schematically illustrating a friction stir welding apparatus according to a first embodiment. FIG. 2 is an explanatory view relating to a first stirring region and a second stirring region. FIG. 3 is a plan view illustrating a first shoulder surface and a second shoulder surface. FIG. 4 is a side view illustrating the shapes of the first shoulder part and the second shoulder part. FIGS. 5 to 7 are plan views illustrating an example of a shape of the first shoulder part. FIG. 8 is an explanatory view illustrating an example of a metal plate before the friction stir welding. FIG. 9 is a flowchart of a friction stir welding method according to the first embodiment.

A friction stir welding apparatus 1 of the first embodiment is an apparatus which performs so-called friction stir welding (FSW) of welding a pair of metal plates 5, by frictionally stirring a beveled part (welded part) 6 formed by making a pair of metal plates 5 butt against each other, using a first rotary tool 21 and a second rotary tool 22 disposed on the front and back sides of the beveled part 6. First, a pair of metal plates 5 to be welded will be described with reference to FIG. 8.

The metal plates 5 are made of, for example, an aluminum alloy, and are large rectangular plate materials having a side of 2 m or more. Further, the thickness of the metal plates 5 is 15 mm or more. As illustrated in FIG. 8, an I-shaped beveled part 6 is formed by making the end surfaces of the pair of metal plates 5 butt against each other. The beveled part 6 is formed as a welding line 9 extending linearly in a predetermined direction. Tab plates 7 are attached to each of the pair of metal plates 5 on both sides in a direction in which the welding line 9 extends. The pair of tab plates 7 on both sides of the welding line 9 are attached to the pair of metal plates 5 by tack welding or the like, thereby fixing the mutual positions of the pair of metal plates 5. At this time, a welding start point of the friction stir welding is located on one tab plate 7, and a welding end point thereof is located on the other tab plate 7. Therefore, the friction stir welding is performed from one tab plate 7 toward the other tab plate 7 through the welding line 9 (the beveled part 6). As will be described in detail later, two bottomed holes 8a and 8b into which each of the first rotary tool 21 and the second rotary tool 22 is inserted in advance are formed at the welding start point on one tab plate 7.

In the friction stir welding apparatus 1 according to the first embodiment, the beveled part 6 against which the pair of metal plates 5 is made to butt is set as a welded part to be subjected to friction stir welding, but the welded part is not particularly limited to the beveled part 6, and for example, the friction stir welding may be performed on a plurality of superimposed metal plates 5.

Here, the pair of metal plates 5 welded by the friction stir welding is handled as a large metal plate, and plastic working is performed in a later process. At this time, a welding defect part such as a poor welding region (kissing bond) caused by non-welded beveled residue and insufficient stirring is formed in the welded part formed by welding the beveled part 6 with the friction stir welding, there is a possibility of damage such as cracks, fractures and the like caused by the welding defect part. Therefore, in the friction stir welding apparatus 1 of the first embodiment, in particular, in order to suppress the formation of welding defect parts on the surface and the center interior of the welding part, the following constitution is adopted.

The friction stir welding apparatus 1 will be described with reference to FIG. 1. The friction stir welding apparatus 1 illustrated in FIG. 1 performs the friction stir welding from both sides of the beveled part 6 in the thickness direction. At this time, the thickness direction of the beveled part 6 becomes a vertical direction. The friction stir welding apparatus 1 includes a friction stirring tool 10, a first pressing rotary mechanism 11, a second pressing rotary mechanism 12, a first movement mechanism 13, a second movement mechanism 14, a tool load detector 16, and a control unit 20. The friction stir welding apparatus 1 performs the friction stir welding on the beveled part 6, while moving the friction stirring tool 10 along the welding line 9 in the predetermined advancing direction in the state of fixing the positions of the pair of metal plates 5.

The friction stirring tool 10 has the first rotary tool 21 and the second rotary tool 22. The first rotary tool 21 is disposed on the upper side (one side) of the beveled part 6 in the thickness direction, with the beveled part 6 interposed therebetween. The first rotary tool 21 rotates about a first rotary axis I1 and is pressed against the upper surface of the beveled part 6. The second rotary tool 22 is disposed on the lower side (the other side) in the thickness direction of the beveled part 6, with the beveled part 6 interposed therebetween. The second rotary tool 22 rotates about the second rotary axis I2 and is pressed against the lower surface of the beveled part 6. At this time, the first rotary tool 21 and the second rotary tool 22 are formed in the same shape, and the first rotary axis I1 and the second rotary axis I2 are provided in parallel along the vertical direction. Therefore, the first rotary axis I1 is orthogonal to the upper surface of the beveled part 6, and the second rotary axis I2 is also orthogonal to the lower surface of the beveled part 6. Hereinafter, the first rotary tool 21 and the second rotary tool 22 will be described.

The first rotary tool 21 has a first tool body 31 and a first probe 32. The first tool body 31 is formed in a cylindrical shape, and a first shoulder part 35 is formed on a front end side that is the side of the second rotary tool 22. An outer circumferential surface of the first shoulder part 35 is a circumferential surface having a predetermined diameter. Further, the surface on the front end side of the first shoulder part 35 is a circular first shoulder surface 35*a* which is in contact with the upper surface of the beveled part 6. The first rotary tool 21 rotates in a state in which the first shoulder surface 35*a* of the first shoulder part 35 is brought into contact with the upper surface of the beveled part 6 to impart heat generated by friction to the beveled part 6, and stirs the metal of the beveled part 6 softened by imparting the heat.

Here, the first shoulder part 35 has a shape illustrated in FIGS. 5 to 7, and may have any shape in the first embodiment. A groove-shaped recessed portion 36 is formed on the first shoulder surface 35*a*, and thus, the first shoulder surface 35*a* becomes an uneven surface. The recessed portion 36 has such a shape that the metal softened by rubbing the first shoulder part 35 and the metal plate 5 is directed to the center side of the first shoulder part 35.

Specifically, the recessed portion 36 illustrated in FIG. 5 is constituted by one piece, and one recessed portion 36 is disposed in a spiral shape (scroll shape) from the outside toward the inside on the first shoulder surface 35*a*. The recessed portion 36 illustrated in FIG. 6 is constituted by two pieces, and the two recessed portions 36 are provided on the first shoulder surface 35*a* at positions which are different in phase by 180°, and are disposed in a spiral shape from the outside toward the inside. The recessed portion 36 illustrated in FIG. 7 is made up of a plurality of pieces, and the plurality of recessed portions 36 is provided at a predetermined interval in the circumferential direction of the first shoulder surface 35*a*, and is disposed linearly from the outside toward the inside.

The first probe 32 will be described referring to FIG. 1 again. The first probe 32 is provided to protrude from the first shoulder surface 35*a* of the first tool body 31 toward the front end side. The first probe 32 is disposed to sink into the interior of the softened beveled part 6 from the upper surface of the beveled part 6. Here, a line passing through the center of the beveled part 6 in the thickness direction is defined as a line C. The first probe 32 is formed such that the length of the beveled part 6 in the thickness direction is longer than half of the thickness of the beveled part 6. That is, the first probe 32 has a length that exceeds the line C from the upper surface side of the beveled part 6. The first probe 32 is fixed to the first tool body 31 to rotate integrally with the first tool body 31.

The first probe 32 is formed in a tapered shape such that the diameter of the rear end side is large and the diameter decreases toward the front end side. The surface of the first probe 32 on the front end side is a circular first front end surface 32*a*. Further, on the outer circumferential surface of the first probe 32, a groove for stirring the metal of the softened beveled part 6 is formed.

The second rotary tool 22 has a second tool body 41 and a second probe 42. Like the first tool body 31, the second tool body 41 is formed in a cylindrical shape, and a second shoulder part 45 is formed on the front end side that is the first rotary tool 21 side. The outer circumferential surface of the second shoulder part 45 is a circumferential surface having a predetermined diameter. Further, the surface the second shoulder part 45 on the front end side is a circular second shoulder surface 45*a* which is in contact with the lower surface of the beveled part 6. The second rotary tool 22 rotates in a state in which the second shoulder surface 45*a* of the second shoulder part 45 is brought into contact with the lower surface of the beveled part 6, thereby imparting heat generated by friction to the beveled part 6, and stirring the metal of the beveled part 6 softened by imparting heat.

Here, the second shoulder part 45 is provided with a recessed portion 36 similar to the first shoulder part 35. Since the recessed portion 36 is the same as the first shoulder part 35, the description thereof will not be provided.

The second probe 42 is provided to protrude from the second shoulder surface 45*a* of the second tool body 41 toward the front end side. Like the first probe 32, the second probe 42 is disposed to sink into the interior of the softened beveled part 6 from the lower surface of the beveled part 6. The second probe 42 is formed such that the length of the beveled part 6 in the thickness direction is longer than half of the thickness of the beveled part 6. That is, the second probe 42 has a length which exceeds the line C from the lower surface side of the beveled part 6. The second probe 42 is fixed to the second tool body 41 to rotate integrally with the second tool body 41.

The diameter of the second probe 42 on the rear end side is large, and the second probe 42 is formed in a tapered shape in which the diameter decreases toward the front end side. A surface of the second probe 42 on the front end side is a circular second front end surface 42*a*. Further, on the outer circumferential surface of the second probe 42, a groove for stirring the metal of the softened beveled part 6 is formed.

Here, the length of the first probe 32 is longer than half of the thickness of the beveled part 6, and the length of the second probe 42 is longer than half of the thickness of the beveled part 6. Therefore, when the first probe 32 and the second probe 42 are disposed to face each other with the beveled part 6 interposed therebetween, in other words, when the first rotary tool 21 and the second rotary tool 22 are disposed so that the first rotary axis I1 and the second rotary axis I2 are coaxial with each other, the first probe 32 and the second probe 42 physically interfere with each other. Therefore, the first rotary tool 21 and the second rotary tool 22 are disposed to be shifted from each other on the welding line 9 so as not to physically interfere with each other.

Specifically, as illustrated in FIG. 1, the first rotary tool 21 and the second rotary tool 22 are disposed to overlap each other inside the beveled part 6 in the thickness direction of the beveled part 6, and to be shifted to the front and rear in the advancing direction on the welding line 9 as illustrated in FIG. 3. At this time, the first rotary tool 21 is disposed on the front side in the advancing direction, and the second rotary tool 22 is disposed on the rear side in the advancing direction. Therefore, (the first probe 32 of) the first rotary tool 21 and (the second probe 42 of) the second rotary tool 22 are disposed to overlap each other inside the beveled part 6 in the thickness direction of the beveled part 6. As illustrated in FIG. 3, the first rotary tool 21 and the second rotary tool 22, which are disposed to be shifted from each other, are disposed such that the first front end surface 32*a* of the first probe 32 intersects with the welding line 9, and the second front end surface 42*a* of the second probe 42 intersects with the welding line 9. More detailed arrangement of the first rotary tool 21 and the second rotary tool 22 will be described later.

The rotary directions of the first rotary tool 21 and the second rotary tool 22 are opposite to each other. Here, the load direction imparted to the beveled part 6 by the first rotary tool 21 and the second rotary tool 22 is larger on the front side in the advancing direction than the rear side in the advancing direction. Therefore, the rotary direction on the front side in the advancing direction of the first rotary tool 21 becomes a loading direction imparted to the beveled part 6, and similarly, the rotary direction on the front side in the advancing direction of the second rotary tool 22 becomes the loading direction imparted to the beveled part 6. Specifically, the loading direction of the first rotary tool 21 becomes a direction from the metal plate 5 on one side (upper side in FIG. 3) to the metal plate 5 on the other side (lower side in FIG. 3), and the loading direction of the second rotary tool 22 becomes a direction from the metal plate 5 on the other side (lower side in FIG. 3) to the metal plate 5 on the other side (upper side in FIG. 3). Therefore, the loading direction of the first rotary tool 21 and the loading direction of the second rotary tool 22 are opposite to each other.

In a case where the rotary directions of the first rotary tool 21 and the second rotary tool 22 are opposite to each other, the flow direction (a tangential direction of rotation) of the metallic material due to the rotation between the first rotary tool 21 and the second rotary tool 22 is in the same direction. Therefore, the metal of the frictionally stirred beveled part 6 flowing around the first rotary tool 21 and the metal of the frictionally stirred beveled part 6 flowing around the second rotary tool 22 flow in the same direction between the first rotary tool 21 and the second rotary tool 22.

In the first embodiment, the rotary directions of the first rotary tool 21 and the second rotary tool 22 are opposite to each other, but the present invention is not limited to this configuration. The first rotary tool 21 and the second rotary tool 22 may be in the same rotary direction, as long as the first and second rotary tools are suitable for friction stir welding.

Next, a first stirring region E1 formed in the beveled part 6 by the first rotary tool 21 and a second stirring region E2 formed in the beveled part 6 by the second rotary tool 22 will be described referring to FIG. 2. The first stirring region E1 is a region which is formed on the upper side of the beveled part 6 and is formed by the first probe 32 of the first rotary tool 21. Therefore, the first stirring region E1 is a region that reaches the interior of the beveled part 6 from the upper surface of the beveled part 6 in the thickness direction, and is formed to exceed the line C from the upper surface of the beveled part 6. The second stirring region E2 is a region which is formed on the lower side of the beveled part 6 and is formed by the second probe 42 of the second rotary tool 22. Therefore, the second stirring region E2 is a region which reaches the interior of the beveled part 6 from the lower surface of the beveled part 6 in the thickness direction, and is formed to exceed the line C from the lower surface of the beveled part 6. Further, the first stirring region E1 and the second stirring region E2 overlap each other in the thickness direction. Specifically, the lower region of the first stirring region E1 and the upper region of the second stirring region E2 are an overlapping region E3 in which the lower region and the upper region overlap each other. Therefore, the first stirring region E1 and the second stirring region E2 are formed over the entire region in the thickness direction of the beveled part 6.

Next, the detailed arrangement of the first rotary tool 21 and the second rotary tool 22 will be described with reference to FIG. 4. As described above, the first rotary tool 21 and the second rotary tool 22 are disposed to be shifted in the front and rear in the advancing direction. At this time, the first rotary tool 21 is pressed against the upper surface of the beveled part 6, and the second rotary tool 22 is pressed against the lower surface of the beveled part 6. Therefore, since the beveled part 6 is pressed from both sides in the thickness direction by the first rotary tool 21 and the second rotary tool 22, in order to suppress the positional variation in the thickness direction, the first rotary tool 21 and the second rotary tool 22 need to be disposed so that the first and second rotary tools can impart the reaction force to each other.

Therefore, in the first rotary tool 21 and the second rotary tool 22, in order to impart reaction forces to each other, at least some parts of the first shoulder part 35 and the second shoulder part 45 are disposed to be shifted in a range of overlapping each other in the thickness direction. More specifically, as illustrated in FIG. 4, when the distance between the first rotary axis I1 and the second rotary axis I2 is set as L, the diameter of the first shoulder part 35 is set as D1, the diameter of the first front end surface 32a is set as d1, the diameter of the second shoulder part 45 is set as D2, and the diameter of the second front end surface 42a is set as d2, the first rotary tool 21 and the second rotary tool 22 are disposed to be shifted from each other to fall within a predetermined range.

Here, the first rotary axis I1 and the second rotary axis I2 are parallel to each other, and the distance L is a length which connects the first rotary axis I1 and the second rotary axis I2 in a direction orthogonal to the first rotary axis I1 and the second rotary axis I2. Further, the diameter D1 and the diameter d1 are diameters centered on the first rotary axis I1, and similarly, the diameter D2 and the diameter d2 are diameters centered on the second rotary axis I2.

In the case of $(D1/2+d2/2) \leq (D2/2+d1/2)$, the distance L is in the range of $(d1/2+d2/2) < L < (D1/2+d2/2)$ as a predetermined range. That is, when the summed length of the radius of the first shoulder part 35 and the radius of the second front end surface 42a of the second probe 42 is equal to or smaller than the summed length of the radius of the second shoulder part 45 and the radius of the first front end surface 32a of the first probe 32, the distance L is longer than the summed length of the radius of the first front end surface 32a and the radius of the second front end surface 42a, and is shorter than the summed length of the radius of the first shoulder part 35 and the radius of the second front end surface 42a.

Further, in the case of $(D1/2+d2/2) \geq (D2/2+d1/2)$, the distance L is in the range of $(d1/2+d2/2) < L < (D2/2+d1/2)$ as a predetermined range. That is, when the summed length of the radius of the first shoulder part 35 and the radius of the second front end surface 42a of the second probe 42 is equal to or larger than the summed length of the radius of the second shoulder part 45 and the radius of the first front end surface 32a of the first probe 32, the distance L is longer than the summed length of the radius of the first front end surface 32a and the radius of the second front end surface 42a, and is shorter than the summed length of the radius of the second shoulder part 45 and the radius of the first front end surface 32a of the first probe 32.

Therefore, the distance L is such a distance that the first shoulder part 35 and the second shoulder part 45 overlap each other in the thickness direction, while suppressing physical interference between the first rotary tool 21 and the second rotary tool 22.

Referring again to FIG. 1, the first pressing rotary mechanism 11 and the second pressing rotary mechanism 12 will be described. The first pressing rotary mechanism 11 is connected to the first rotary tool 21 and is controlled by the control unit 20. The first pressing rotary mechanism 11 moves the first rotary tool 21 toward the upper surface of the beveled part 6 and rotates the first rotary tool 21. Therefore, in a state in which the first shoulder surface 35a of the first shoulder part 35 of the first rotary tool 21 is pressed against the upper surface of the beveled part 6, the first pressing rotary mechanism 11 rotates the first rotary tool 21.

The second pressing rotary mechanism 12 is configured in the same manner as the first pressing rotary mechanism 11, is connected to the second rotary tool 22, and is controlled by the control unit 20. The second pressing rotary mechanism 12 moves the second rotary tool 22 toward the lower surface of the beveled part 6 and rotates the second rotary tool 22. Therefore, in a state in which the second shoulder surface 45a of the second shoulder part 45 of the second rotary tool 22 is pressed against the lower surface of the beveled part 6, the second pressing rotary mechanism 12 rotates the second rotary tool 22.

The first movement mechanism 13 is connected to the first rotary tool 21 and is controlled by the control unit 20. The first movement mechanism 13 moves the first rotary tool 21 along the top of the welding line 9, using a first motor (not illustrated) as a power source. Further, the first motor is connected to a tool load detector 16 which will be described later.

The second movement mechanism 14 is configured similarly to the first movement mechanism 13, is connected to the second rotary tool 22, and is controlled by the control unit 20. The second movement mechanism 14 moves the second rotary tool 22 along the welding line 9, using a second motor (not illustrated) as a power source. The second motor is also connected to a tool load detector 16 to be described later.

The first movement mechanism 13 and the second movement mechanism 14 move the first rotary tool 21 and the second rotary tool 22 in synchronization with each other, and moves the first rotary tool 21 and the second rotary tool 22 so that the first rotary tool 21 is the front side in the advancing direction, and the second rotary tool 22 is the rear side in the advancing direction.

The tool load detector 16 includes a first motor load detector 51 which detects the load applied to the first motor of the first movement mechanism 13, and a second motor load detector 52 which detects the load applied to the second motor of the second movement mechanism 14. The first motor load detector 51 is connected to the control unit 20, and outputs the load to be applied to the first motor toward the control unit 20. The second motor load detector 52 is connected to the control unit 20, and outputs the load to be applied to the second motor toward the control unit 20.

The control unit 20 is connected with the first pressing rotary mechanism 11, the second pressing rotary mechanism 12, the first movement mechanism 13 and the second movement mechanism 14, and controls the mechanisms 11, 12, 13 and 14, respectively. Further, the control unit 20 is connected with the first motor load detector 51 and the second motor load detector 52, and controls each of the mechanisms 11, 12, 13 and 14 based on the detection results of the respective detectors 51 and 52.

Specifically, the control unit 20 controls the first pressing rotary mechanism 11 and the second pressing rotary mechanism 12 to move the first rotary tool 21 and the second rotary tool 22 toward the beveled part 6 so that the load to the beveled part 6 interposed between the first rotary tool 21 and the second rotary tool 22 becomes a predetermined load. At this time, the control unit 20 balances the pressing forces of the first rotary tool 21 and the second rotary tool 22 so that the position of the beveled part 6 in the thickness direction is maintained. Further, the control unit 20 controls the first pressing rotary mechanism 11 and the second pressing rotary mechanism 12 to control the rotation so that the rotary directions of the first rotary tool 21 and the second rotary tool 22 are opposite to each other and the first rotary tool 21 and the second rotary tool 22 rotate at a predetermined rotation speed.

Further, the control unit 20 controls the first movement mechanism 13 and the second movement mechanism 14 to move the first rotary tool 21 and the second rotary tool 22 along the welding line 9 in a predetermined advancing direction. At this time, the control unit 20 moves the first rotary tool 21 and the second rotary tool 22 so that the first rotary tool 21 is on the front side in the advancing direction and the second rotary tool 22 is on the rear side in the advancing direction.

Here, when moving the first rotary tool 21 and the second rotary tool 22, because the first rotary tool 21 and the second rotary tool 22 are brought into contact with each other in the advancing direction on the welding line 9, a large load is likely to be applied to the first rotary tool 21 and the second rotary tool 22. At this time, the control unit 20 controls the first movement mechanism 13 and the second movement mechanism 14 based on the detection results of the first motor load detector 51 and the second motor load detector 52, thereby adjusting the positions of the first rotary tool 21 and the second rotary tool 22 in the advancing direction so that the first rotary tool 21 and the second rotary tool 22 are in a non-contact state. Specifically, since the first rotary tool 21 is located on the front side in the advancing direction as compared with the second rotary tool 22, the control unit 20 determines that the second rotary tool 22 presses the first rotary tool 21 in the advancing direction, when the load of the second motor detected by the second motor load detector 52 increases and when the load of the first motor detected by the first motor load detector 51 decreases. In this case, the control unit 20 controls at least one of the first movement mechanism 13 and the second movement mechanism 14 to make the movement speed of the first rotary tool 21 faster than the movement speed of the second rotary tool 22 by a predetermined time, and separates the first rotary tool 21 and the second rotary tool 22 from each other.

Next, a friction stir welding method using the friction stir welding apparatus 1 of the first embodiment will be described with reference to FIG. 9. A pair of metal plates 5 to be subjected to friction stir welding is in a state illustrated in FIG. 8 in advance. That is, the pair of metal plates 5 is temporarily welded (temporarily tacked) by the pair of tab plates 7 in a state in which the end surfaces are made to butt against each other to form the beveled part 6. At this time, two bottomed holes 8a and 8b are formed on one tab plate 7. The two bottomed holes 8a and 8b serve as welding start points of the friction stir welding apparatus 1, one bottomed hole 8a is formed on the upper surface of the tab plate 7, and the other bottomed hole 8b is formed on the lower surface of the tab plate 7. The first probe 32 of the first rotary tool 21 is inserted into the upper bottomed hole 8a. At this time, the volume of the upper bottomed hole 8a is set to be smaller than the volume of the first probe 32 so that the metallic material frictionally stirred by the first rotary tool 21 is not insufficient. Further, the second probe 42 of the second rotary tool 22 is inserted into the lower bottomed hole 8b. At this time, similarly to the upper bottomed hole 8a, the volume of the lower bottomed hole 8b is set to be smaller than the volume of the second probe 42 so that the metallic material frictionally stirred by the second rotary tool 22 is not insufficient.

When performing the friction stir welding using the friction stir welding apparatus 1, first, the control unit 20 controls the first pressing rotary mechanism 11 and the second pressing rotary mechanism 12 to insert the first rotary tool 21 and the second rotary tool 22 into the two bottomed holes 8a and 8b which are formed in the welding start point of the tab plate 7 in advance. At this time, the first rotary tool 21 and the second rotary tool 22 may be simultaneously inserted into the two bottomed holes 8a and 8b, or the first and second rotary tools may be inserted one by one. Further, the control unit 20 controls the first pressing rotary mechanism 11 and the second pressing rotary mechanism 12 to rotate the first rotary tool 21 and the second rotary tool 22 (step S1: rotation process).

Subsequently, the control unit 20 controls the first pressing rotary mechanism 11, the second pressing rotary mechanism 12, the first movement mechanism 13 and the second movement mechanism 14 to relatively adjust the inserting positions of the first rotary tool 21 and the second rotary tool 22 in the thickness direction and the front-rear position in the advancing direction (step S2: position adjustment process). Specifically, while controlling the inserting positions of the first rotary tool 21 and the second rotary tool 22 in the thickness direction, the control unit 20 controls the first pressing rotary mechanism 11 and the second pressing rotary mechanism 12 so that the load applied to the beveled part 6 becomes a predetermined load. Further, the control unit 20 controls the first movement mechanism 13 and the second movement mechanism 14 so that the distance L between the first rotary tool 21 and the second rotary tool 22 becomes a predetermined distance, based on the detection result of the tool load detector 16, while controlling the front-rear positions of the first rotary tool 21 and the second rotary tool 22 in the advancing direction.

Thereafter, the control unit 20 controls the first movement mechanism 13 and the second movement mechanism 14 to move the first rotary tool 21 and the second rotary tool 22 from the welding start point of one tab plate 7 to the welding end point on the other tab plate 7 through the welding line 9 (step S3: friction stir welding process). At this time, since the first rotary tool 21 is disposed on the front side in the advancing direction and the second rotary tool 22 is disposed on the rear side in the advancing direction, in the friction stir welding process S3, after forming the first stirring region E1 in advance, the second stirring region E2 is formed. Therefore, in the friction stir welding process, friction stir welding (the first friction stir welding process) of the first rotary tool 21, and friction stir welding (the second friction stir welding process) of the second rotary tool 22 are performed simultaneously. In the friction stir welding process S3, as described above, the control unit 20 controls the first movement mechanism 13 and the second movement mechanism 14 to adjust the movement speed of the first rotary tool 21 and the second rotary tool 22, thereby adjusting the relative position so that the first rotary tool 21 and the second rotary tool 22 are in a non-contact state.

When the first rotary tool 21 and the second rotary tool 22 reach the welding end point, the control unit 20 controls the first pressing rotary mechanism 11 and the second pressing rotary mechanism 12 to pull out the first rotary tool 21 and the second rotary tool 22 from the other tab plate 7, while rotating the first rotary tool 21 and the second rotary tool 22 (step S4: drawing-out process).

As described above, according to the first embodiment, in the friction stir welding process S3, it is possible to form the first stirring region E1 and the second stirring region E2 in the beveled part 6. Further, the first stirring region E1 and second stirring region E2 thus formed can be made to overlap each other in the thickness direction of the beveled part 6. Therefore, it is possible to perform the friction stir welding over the entire region in the thickness direction of the beveled part 6 by the first rotary tool 21 and the second rotary tool 22. Therefore, in the first embodiment, since no predetermined gap is formed between the first rotary tool 21 and the second rotary tool 22, it is possible to suppress the occurrence of the welding defect part. Even if the thickness of the beveled part 6 changes, since the overlapping region E3 in which the first stirring region E1 and the second stirring region E2 overlap each other may be varied in the thickness direction, it is not necessary to change the length of the first rotary tool 21 and the second rotary tool 22. Accordingly, it is possible to suppress an increase in load on each of the rotary tools 21 and 22. As described above, in the first embodiment, it is possible to suppress the occurrence of the welding defect part and to suitably perform the friction stir welding of the beveled part 6, while suppressing the load applied to each of the rotary tools 21 and 22, even when the thickness of the pair of metal plates 5 in the beveled part 6 changes.

According to the first embodiment, when the first rotary tool 21 and the second rotary tool 22 move on the welding line 9 in a state in which the first front end surface 32a of the first rotary tool 21 and the second front end surface 42a of the second rotary tool 22 intersect with the welding line 9, it is possible to form the first stirring region E1 and the second stirring region E2. Therefore, since the first stirring region E1 and the second stirring region E2 can be formed over the entire region in the thickness direction on the butting surface on which the pair of metal plates 5 are made to butt against each other, it is possible to suppress the occurrence of the welding defect part.

Further, according to the first embodiment, it is possible to simultaneously perform the friction stir welding of the first rotary tool 21 and the friction stir welding of the second rotary tool 22. At this time, by disposing the first rotary tool 21 and the second rotary tool 22 to be shifted to front and back in the advancing direction, it is possible to suppress the physical interference between the first rotary tool 21 and the second rotary tool 22.

Further, according to the first embodiment, since the first rotary tool 21 and the second rotary tool 22 can impart the reaction forces to each other across the beveled part 6, it is possible to suitably fictionally stir the beveled part 6, while maintaining the position of the beveled part 6 in the thickness direction at a predetermined position.

Further, according to the first embodiment, since the distance L between the first rotary tool 21 and the second rotary tool 22 can be set within the aforementioned predetermined range, it is possible to more reliably impart the reaction force to each other.

Further, according to the first embodiment, it is possible to invert the rotary direction of the first rotary tool 21 and the rotary direction of the second rotary tool 22. Therefore, the load direction applied to the beveled part 6 on the front side of the first rotary tool 21 in the advancing direction and the load direction imparted to the beveled part 6 on the front side of the second rotary tool 22 in the advancing direction are set to the opposite directions. Therefore, since it is possible to cancel out the load applied to the beveled part 6 by the first rotary tool 21 and the load applied to the beveled part 6 by the second rotary tool 22, it is possible to suppress the load from being biased against the beveled part 6. Further, the flow direction of the metallic material to be frictionally stirred can be set to one direction between the first rotary tool 21 and the second rotary tool 22. Therefore, it is possible to allow the frictionally stirred metallic material to smoothly flow.

Further, according to the first embodiment, since the first rotary tool 21 and the second rotary tool 22 can be made to have the same shape, the conditions of friction stirring of the first rotary tool 21 and the second rotary tool 22 can be set to the substantially same condition on both sides of the beveled part 6 in the thickness direction, and it is possible to suitably perform the friction stir welding of the beveled part 6.

Although the first rotary tool 21 and the second rotary tool 22 have the same shape in the first embodiment, as long as the first probe 32 and the second probe 42 are disposed to overlap each other in the thickness direction of the beveled part 6, the first and second rotary tools may have different shapes. For example, the length of the first probe 32 of the first rotary tool 21 may be longer than the length of the second probe 42 of the second rotary tool 22, or the length of the second probe 42 of the second rotary tool 22 may be longer than the length of the first probe 32 of the first rotary tool 21.

In the first embodiment, although the first rotary axis I1 and the second rotary axis I2 are disposed to be orthogonal to the upper and lower surfaces of the beveled part 6, the first rotary axis I1 of the first rotary tool 21 may be inclined with respect to the upper surface of the beveled part 6 by a predetermined angle, or similarly, the second rotary axis I2 of the second rotary tool 22 may be inclined with respect to the lower surface of the beveled part 6 by a predetermined angle. The predetermined angle is, for example, an angle in a range of more than 0° and 3° or less. According to this configuration, since the first rotary axis I1 of the first rotary tool 21 and the second rotary axis I2 of the second rotary tool 22 can be inclined with respect to the upper and lower surfaces of the beveled part 6, the respective shoulder surfaces 35a and 45a of the respective shoulder parts 35 and 45 come into contact with the upper and lower surfaces of the beveled part 6 in an inclined manner. Accordingly, it is possible to actively stir the beveled part 6.

Figure 10:
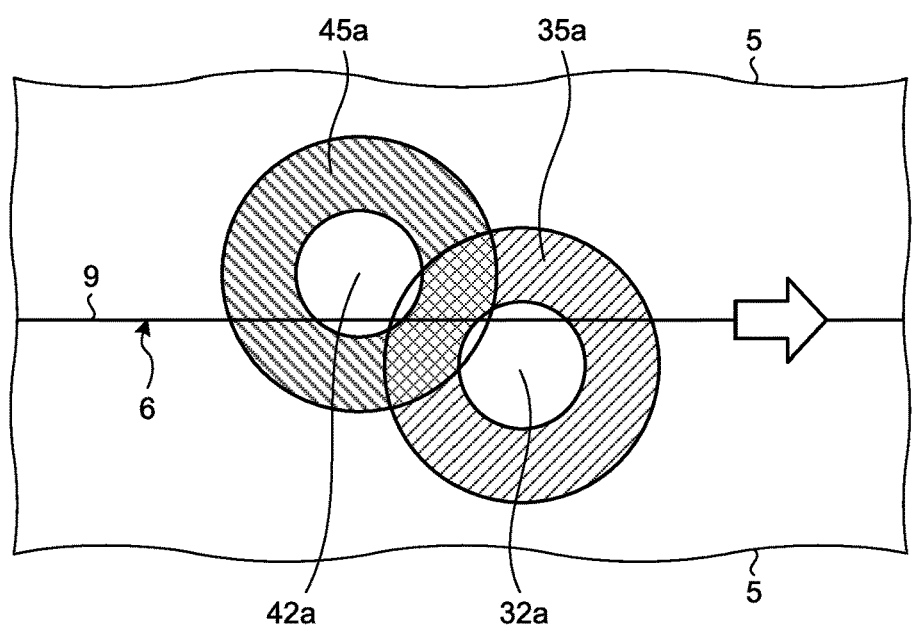
FIG. 10 is a schematic configuration diagram schematically illustrating a part of a friction stir welding apparatus according to a first modified example of the first embodiment.

In the first embodiment, the first rotary tool 21 and the second rotary tool 22 are disposed to be shifted to the front and rear in the advancing direction, but they may be disposed as in a first modified example illustrated in FIG. 10. FIG. 10 is a schematic configuration diagram schematically illustrating a part of a friction stir welding apparatus according to the first modified example of the first embodiment. As illustrated in FIG. 10, in the friction stir welding apparatus 1 according to the first modified example, the first rotary tool 21 and the second rotary tool 22 are disposed to be shifted to the front and rear in the advancing direction within an orthogonal plane orthogonal to the thickness direction of the beveled part 6, and are disposed to be shifted to the left and right in the width direction orthogonal to the advancing direction. In the modified example, the first rotary tool 21 and the second rotary tool 22 are also disposed so that a first front end surface 32a and a second front end surface 42a intersect with the welding line 9.

According to the first modified example, the distance L between the first rotary tool 21 and the second rotary tool 22 expands as the first rotary tool 21 and the second rotary tool 22 are shifted to the left and right in the width direction. Accordingly, it is possible to bring the first rotary tool 21 and the second rotary tool 22 closer to the advancing direction. For this reason, by disposing the first rotary tool 21 and the second rotary tool 22 to be shifted to the left and right in the width direction, it is possible to more suitably suppress physical interference between the first rotary tool 21 and the second rotary tool 22.

Second Embodiment

Figure 11:
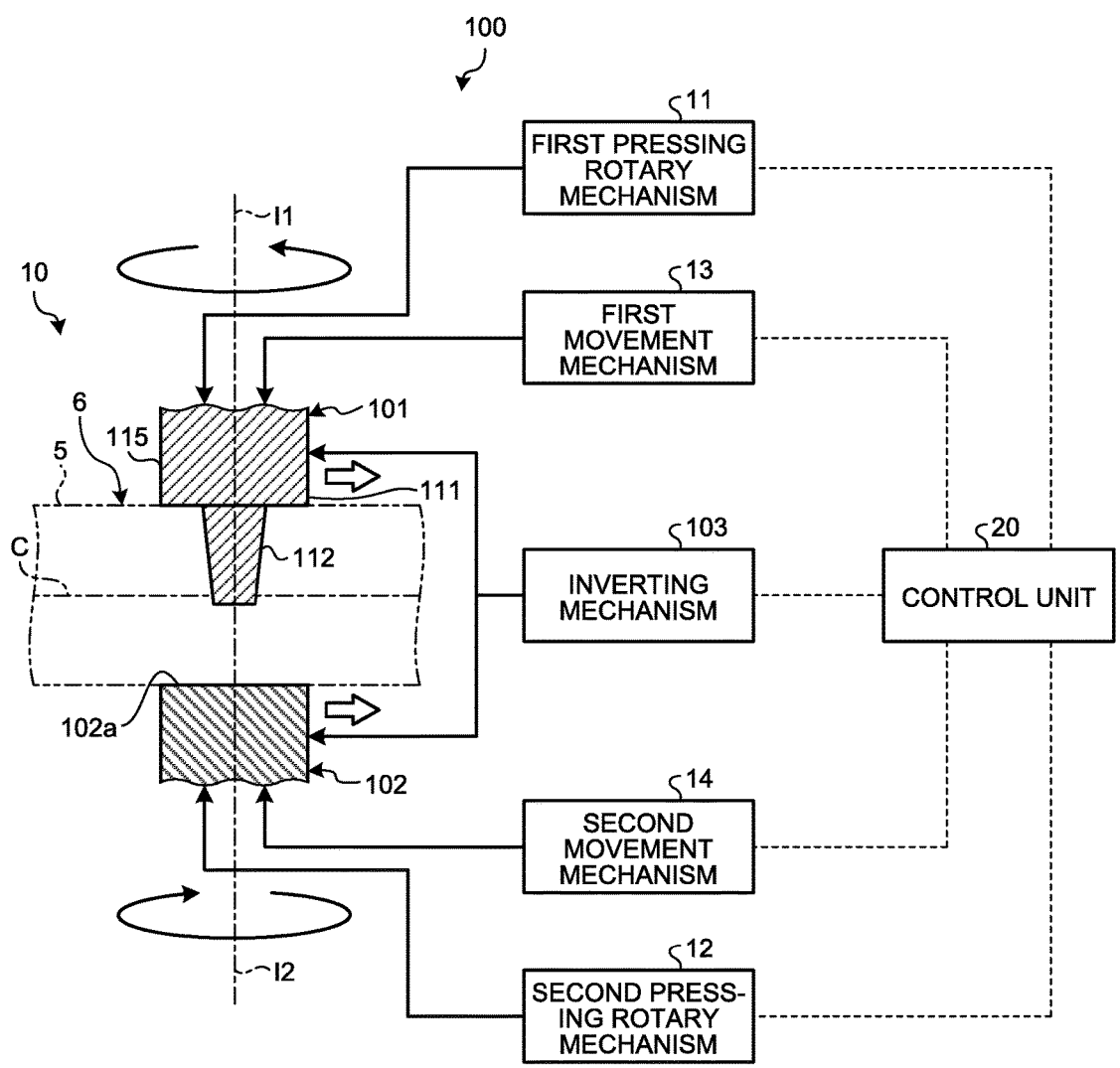
FIG. 11 is a schematic configuration diagram schematically illustrating a friction stir welding apparatus according to a second embodiment.
Figure 12:
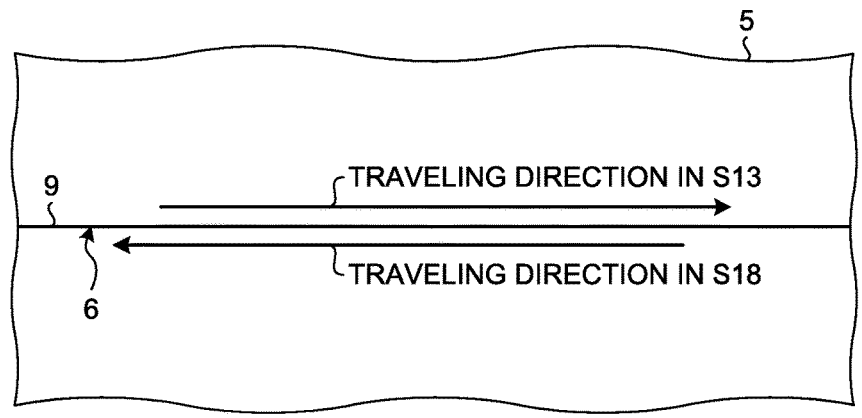
FIG. 12 is a plan view illustrating an advancing direction at the time of the friction stir welding.
Figure 13:
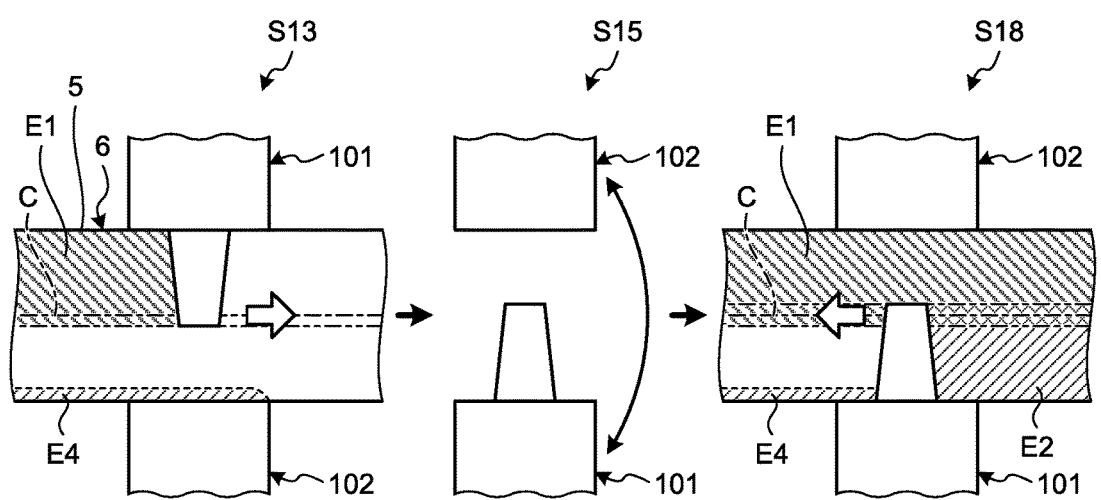
FIG. 13 is an explanatory view illustrating a friction stir welding operation performed by the friction stir welding apparatus according to the second embodiment.
Figure 14:
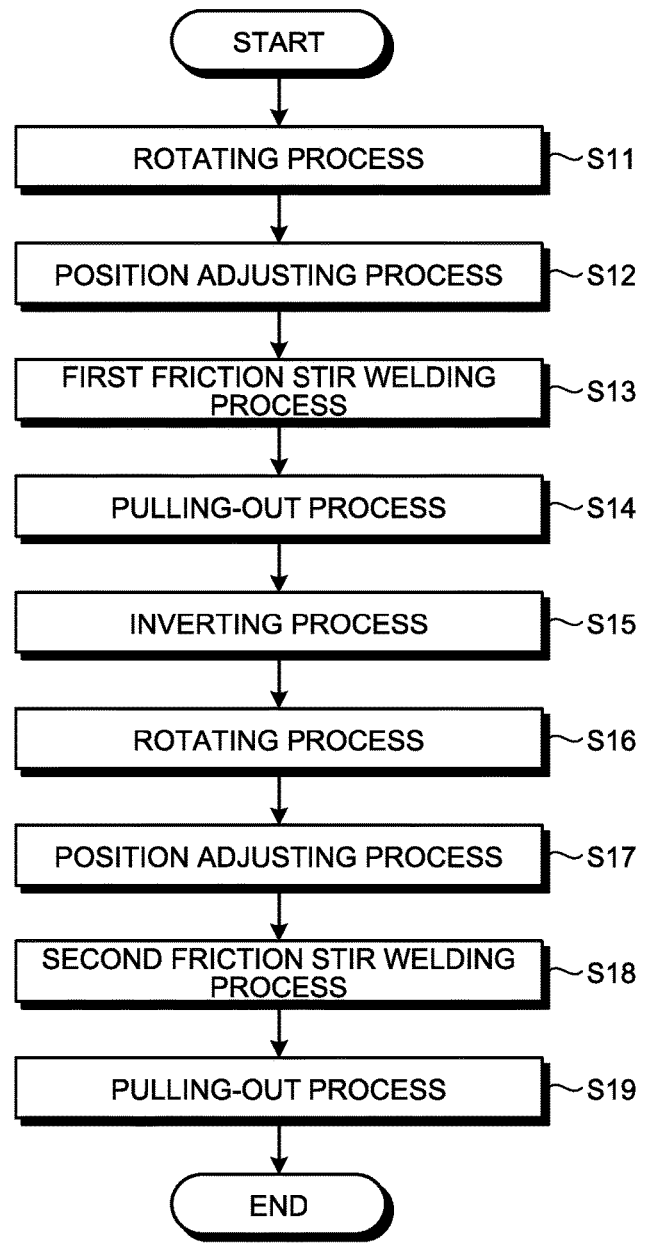
FIG. 14 is a flowchart of a friction stir welding method according to the second embodiment.

Next, a friction stir welding apparatus 100 according to a second embodiment will be described with reference to FIGS. 11 to 14. FIG. 11 is a schematic configuration diagram schematically illustrating a friction stir welding apparatus according to a second embodiment. FIG. 12 is a plan view illustrating the advancing direction at the time of friction stir welding. FIG. 13 is an explanatory view illustrating the friction stir welding operation performed by the friction stir welding apparatus according to the second embodiment. FIG. 14 is a flowchart of the friction stir welding method according to the second embodiment. In the second embodiment, in order to avoid repeated description, portions different from the first embodiment will be described, and portions having the same configurations as those in the first embodiment will be denoted by the same reference numerals. Although the first stirring region E1 and the second stirring region E2 were simultaneously formed in the friction stir welding apparatus 1 of the first embodiment, in the friction stir welding apparatus 100 according to the second embodiment, after the first stirring region E1 is formed, the second stirring region E2 is formed. Hereinafter, the friction stir welding apparatus 100 according to the second embodiment will be described.

As illustrated in FIG. 11, in the friction stir welding apparatus 100 according to the second embodiment, a friction stirring tool 10 has a rotary tool 101 and a reaction force rotary tool 102. The friction stir welding apparatus 100 further includes an inverting mechanism 103 which inverts the positions of the rotary tool 101 and the reaction force rotary tool 102.

The rotary tool 101 is inverted in position between the upper side and the lower side of the beveled part 6 by the inverting mechanism 103. Therefore, when the rotary tool 101 is disposed on the upper side in the thickness direction across the beveled part 6, the rotary tool 101 functions as the first rotary tool 21 of the first embodiment. When the rotary tool 101 is disposed on the lower side in the thickness direction across the beveled part 6, the rotary tool 101 functions as the second rotary tool 22 of the first embodiment. The rotary tool 101 rotates about the first rotary axis I1 and is pressed against the upper and lower surfaces of the beveled part 6.

The reaction force rotary tool 102 is disposed on the opposite side of the rotary tool 101 across the beveled part 6. The reaction force rotary tool 102 is inverted in position between the upper side and the lower side of the beveled part 6 by the inverting mechanism 103. Therefore, when the rotary tool 101 functions as the first rotary tool 21, the reaction force rotary tool 102 functions as a first reaction force rotary tool that imparts the reaction force to the rotary tool 101. Further, when the rotary tool 101 functions as the second rotary tool 22, the reaction force rotary tool 102 functions as a second reaction force rotary tool that imparts the reaction force to the rotary tool 101. The reaction force rotary tool 102 rotates about the second rotary axis I2 and is pressed against the upper and lower surfaces of the beveled part 6 on the opposite side to the rotary tool 101.

At this time, the first rotary axis I1 of the rotary tool 101 and the second rotary axis I2 of the reaction force rotary tool 102 are provided coaxially along the vertical direction. Therefore, the first rotary axis I1 and the second rotary axis I2 are orthogonal to the upper and lower surfaces of the beveled part 6. Hereinafter, the rotary tool 101 and the reaction force rotary tool 102 will be described. Since the rotary tool 101 has substantially the same configuration as those of the first rotary tool 21 and the second rotary tool 22 of the first embodiment, some of the description will not be provided.

The rotary tool 101 has a tool body 111 and a probe 112. Like the first embodiment, the tool body 111 is formed in a cylindrical shape, and a shoulder part 115 is formed on the front end side which is the reaction force rotary tool 102 side. The probe 112 is provided to protrude toward the front end side from the shoulder part 115 of the tool body 111. The probe 112 is formed so that the length of the beveled part 6 in the thickness direction is longer than half of the thickness of the beveled part 6.

The reaction force rotary tool 102 is formed in a cylindrical shape, and the surface on the front end side which is the beveled part 6 side is a circular abutting surface 102a which abuts with the beveled part 6. The abutting surface 102a is a flat surface. The reaction force rotary tool 102 rotates in a state in which the abutting surface 102a is brought into contact with the beveled part 6, thereby imparting heat caused by friction to the beveled part 6, while imparting a reaction force to the rotary tool 101. In the second embodiment, the abutting surface 102a is formed as a flat surface, but this shape is not particularly limited, and by forming the groove-shaped recessed portion 36 of the first embodiment on the entire surface of the abutting surface 102a, the abutting surface 102a may be provided as an uneven surface.

The rotary tool 101 and the reaction force rotary tool 102 are disposed to face each other across the beveled part 6, and the first rotary axis I1 and the second rotary axis I2 are coaxial with each other. At this time, the rotary tool 101 and the reaction force rotary tool 102 are opposite to each other with a predetermined gap in the thickness direction of the beveled part 6. The rotary directions of the rotary tool 101 and the reaction force rotary tool 102 may be opposite to each other or may be identical to each other.

Here, the first stirring region E1 formed in the beveled part 6 by the rotary tool 101 before inversion by the inverting mechanism 103, and the second stirring region E2 formed in the beveled part 6 by the rotary tool 101 after inversion are the same as the regions illustrated in FIG. 2 of the first embodiment.

Because the rotary tool 101 and the reaction force rotary tool 102 are provided with a predetermined gap in the thickness direction, when moving in the advancing direction along the welding line 9, there is a low possibility of contact between them. Therefore, the movement control performed by the tool load detector 16 of the control unit 20 may be omitted.

The inverting mechanism 103 inverts the positions of the upper and lower sides in the thickness direction of the rotary tool 101 and the reaction force rotary tool 102 with the beveled part 6 therebetween. Further, the rotary tool 101 before inversion is connected to the first pressing rotary mechanism 11 and is moved by the first movement mechanism 13. Further, the reaction force rotary tool 102 before inversion is connected to the second pressing rotary mechanism 12 and is moved by the second movement mechanism 14. On the other hand, the rotary tool 101 after inversion is connected to the second pressing rotary mechanism 12 and is moved by the second movement mechanism 14. Further, the reaction force rotary tool 102 after inversion is connected to the first pressing rotary mechanism 11 and is moved by the first movement mechanism 13. Although the inverting mechanism 103 inverts the rotary tool 101 and the reaction force rotary tool 102, the inverting mechanism 103 is not particularly limited to this configuration and may also invert the first pressing rotary mechanism 11 and the second pressing rotary mechanism 12, or may also invert the first movement mechanism 13 and the second movement mechanism 14.

Next, a friction stir welding method using the friction stir welding apparatus 100 of the second embodiment will be described with reference to FIGS. 12 to 14. As illustrated in FIG. 12, in the second embodiment, the advancing direction (the advancing direction in step S13 to be described later) of the rotary tool 101 before inversion for forming the first stirring region E1 is opposite to the advancing direction (the advancing direction in step S18 to be described later) of the rotary tool 101 after inversion for forming the second stirring region E2. Here, the pair of metal plates 5 subjected to friction stir welding is the same as that in the first embodiment, but when the advancing directions become the opposite direction before and after inversion, in the two bottomed holes 8a and 8b formed on the tab plate 7, one bottomed hole 8a is formed on one tab plate 7 and the other bottomed hole 8b is formed on the other tab plate 7. That is, in the second embodiment, one bottomed hole 8a is formed on the upper surface of one tab plate 7 and the other bottomed hole 8b is formed on the lower surface of the other tab plate 7.

When performing the friction stir welding using the friction stir welding apparatus 100, first, the control unit 20 controls the first pressing rotary mechanism 11 to insert the rotary tool 101 before inversion into the upper bottomed hole 8a formed on the welding start point of one tab plate 7 in advance. Further, the control unit 20 controls the second pressing rotary mechanism 12 to bring the reaction force rotary tool 102 before inversion into contact with the beveled part 6 on the side (on the lower side) opposite to the rotary tool 101. Further, the control unit 20 controls the first pressing rotary mechanism 11 and the second pressing rotary mechanism 12 to rotate the rotary tool 101 and the reaction force rotary tool 102 (step S11: rotation process).

Subsequently, the control unit 20 controls the first pressing rotary mechanism 11, the second pressing rotary mechanism 12, the first movement mechanism 13 and the second movement mechanism 14 to relatively adjust the positions of the rotary tool 101 and the reaction force rotary tool 102 in the thickness direction, and the front-rear positions thereof in the advancing direction (step S12: position adjusting process). Specifically, while controlling the positions of the rotary tool 101 and the reaction force rotary tool 102 in the thickness direction, the control unit 20 controls the first pressing rotary mechanism 11 and the second pressing rotary mechanism 12 so that the load applied to the beveled part 6 becomes a predetermined load. Further, the control unit 20 controls the front-rear positions of the rotary tool 101 and the reaction force rotary tool 102 in the advancing direction, and controls the first movement mechanism 13 and the second movement mechanism 14 so that the first rotary axis I1 and the second rotary axis I2 are coaxial with each other.

Thereafter, as illustrated in FIG. 13, the control unit 20 controls the first movement mechanism 13 and the second movement mechanism 14 to move the rotary tool 101 and the reaction force rotary tool 102 to the welding end point on the other tab plate 7 from the welding start point of one tab plate 7 through the welding line 9 (step S13: first friction stir welding process). At this time, since the rotary tool 101 is disposed on the upper side of the beveled part 6 in the thickness direction, the first stirring region E1 is formed in the first friction stir welding process. Even on the lower side of the beveled part 6 in the thickness direction, the lower surface of the beveled part 6 is flattened by heat generation between the reaction force rotary tool 102 and the beveled part 6, and a tack welding and stirring region E4 of 1 mm or less is formed on the lower surface of the beveled part 6, and is in a state of being temporarily welded on the lower side of the beveled part 6.

When the rotary tool 101 and the reaction force rotary tool 102 reach the welding end point, the control unit 20 controls the first pressing rotary mechanism 11 and the second pressing rotary mechanism 12 to pull out the rotary tool 101 and the reaction force rotary tool 102 from the other tab plate 7, while rotating the rotary tool 101 and the reaction force rotary tool 102 (step S14: drawing-out process).

Subsequently, as illustrated in FIG. 13, the control unit 20 controls the inverting mechanism 103 to perform an inverting process of inverting the positions of the rotary tool 101 and the reaction force rotary tool 102 in the thickness direction across the beveled part 6 (tool inverting process) (step S15). That is, the inverting mechanism 103 locates the rotary tool 101, which is located on the upper side across the beveled part 6, on the lower side, and locates the reaction force rotary tool 102, which is located on the lower side, on the upper side. Therefore, the positions of the pair of metal plates 5 are maintained.

Subsequently, the control unit 20 controls the second pressing rotary mechanism 12 to insert the inverted rotary tool 101 into the lower bottomed hole 8b formed at the welding start point of the other tab plate 7 in advance. Further, the control unit 20 controls the second pressing rotary mechanism 12 to bring the reaction force rotary tool 102 after inversion into contact with the beveled part 6 on the opposite side (upper side) to the rotary tool 101. Further, the control unit 20 controls the first pressing rotary mechanism 11 and the second pressing rotary mechanism 12 to rotate the rotary tool 101 and the reaction force rotary tool 102 (step S16: rotation process).

Subsequently, as in the step S12, the control unit 20 controls the first pressing rotary mechanism 11, the second pressing rotary mechanism 12, the first movement mechanism 13, and the second movement mechanism 14 to relatively adjust the positions of the rotary tool 101 and the reaction force rotary tool 102 in the thickness direction and the front-rear positions thereof in the advancing direction (step S17: position adjusting process).

Subsequently, as illustrated in FIG. 13, the control unit 20 controls the first movement mechanism 13 and the second movement mechanism 14 to move the rotary tool 101 and the reaction force rotary tool 102 to the welding end point on one tab plate 7 from the welding start point of the other tab plate 7 through the welding line 9 (step S18: second friction stir welding process). At this time, since the rotary tool 101 is disposed on the lower side of the beveled part 6 in the thickness direction, in the second friction stir welding process, the second stirring region E2 corresponding to the length of the rotary tool 101 is formed to overlap the tack welding and stirring region E4.

When the rotary tool 101 and the reaction force rotary tool 102 reach the welding end point, the control unit 20 controls the first pressing rotary mechanism 11 and the second pressing rotary mechanism 12 to pull out the rotary tool 101 and the reaction force rotary tool 102 from one tab plate 7, while rotating the rotary tool 101 and the reaction force rotary tool 102 (step S19: drawing-out process).

In this way, in the friction stir welding method, since the second friction stir welding process S18 is performed after performing the first friction stir welding process S13, after the first stirring region E1 is formed on the upper side of the beveled part 6, the second stirring region E2 is formed on the lower side of the beveled part 6. Further, in the first friction stir welding process S13 and the second friction stir welding process S18, the control unit 20 controls the first movement mechanism 13 and the second movement mechanism 14 to adjust the movement speed of the rotary tool 101 and the reaction force rotary tool 102, thereby adjusting the relative position so that the first rotary axis I1 and the second rotary axis I2 are coaxial with each other.

In this way, according to the second embodiment, in the first friction stir welding process S13, the first stirring region E1 can be formed, using the rotary tool 101 and the reaction force rotary tool 102. Further, in the second friction stir welding process S18, the second stirring region E2 can be formed, using the rotary tool 101 and the reaction force rotary tool 102. At this time, the reaction force rotary tool 102 can suppress the positional variation of the beveled part 6 in the thickness direction by imparting a reaction force to the rotary tool 101 and can impart heat input due to the rotation to the beveled part 6. Since the first stirring region E1 and second stirring region E2 thus formed overlap each other in the thickness direction of the beveled part 6, it is possible to perform friction stirring over the entire region in the thickness direction, and it is possible to prevent the occurrence of the welding defect part. Further, even if the thickness of the beveled part 6 changes, the overlapping region E3 in which the first stirring region E1 and the second stirring region E2 overlap each other may be varied in the thickness direction. Accordingly, it is not necessary to change the length of the rotary tool 101, and it is possible to suppress an increase in load on the rotary tool 101. As described above, in the second embodiment, it is possible to suppress the occurrence of the welding defect part and to suitably perform the friction stir welding of the beveled part 6, while suppressing the load applied to the rotary tool 101, even when the thickness of the pair of metal plates 5 in the beveled part 6 changes.

Further, according to the second embodiment, at the time of friction stirring, the surface of the beveled part 6 on the side with which the abutting surface 102a abuts can be leveled to be a flat surface. Therefore, even when there is unevenness in the beveled part 6 of the metallic material 5, the reaction force rotary tool 102 can be brought into close contact with the beveled part 6, and the reaction force of the rotary tool 101 can be stably supported. Accordingly, the friction stir welding can be suitably performed. Further, since the contact area in the beveled part 6 with which the reaction force rotary tool 102 comes into contact is smaller than a case where a planar backing metal abuts against the beveled part 6, it is possible to reduce heat which escapes to the reaction force rotary tool 102 side (the backing metal side), and it is possible to weld the beveled part 6 with less energy.

Further, according to the second embodiment, the positions of the pair of metal plates 5 can be maintained without inverting the positions of the pair of metal plates 5. Therefore, it is possible to execute the first friction stir welding process S13 and the second friction stir welding process S18, without performing the inverting work of the pair of metal plates 5.

According to the second embodiment, by performing the tool inverting process S15, the first stirring region E1 and the second stirring region E2 can be formed by the rotary tool 101.

According to the second embodiment, when the first stirring region E1 is formed on the upper side of the beveled part 6, because a tack welding and stirring region E4 to be temporarily welded is formed on the lower side of the beveled part 6, it is possible to suppress foreign matter entering the non-welded region by the first stirring region E1 and the tack welding and stirring region E4.

According to the second embodiment, it is possible to set the advancing direction in the first friction stir welding process S13 and the advancing direction in the second friction stir welding process S18 to the opposite directions. Therefore, the welding end point of the rotary tool 101 and the reaction force rotary tool 102 before inversion can be used as the welding start point of the rotary tool 101 and the reaction force rotary tool 102 after inversion. Therefore, it is possible to reduce the movement of the rotary tool 101 and the reaction force rotary tool 102. When the advancing direction in the first friction stir welding process S13 and the advancing direction in the second friction stir welding process S18 are in the opposite directions, the influence due to the heat input in the first friction stirring process S13 is exerted on the welding start point of the second friction stirring process S18 to weld the beveled part 6 in a state in which the metallic material is heated and softened. Accordingly, since it is necessary to change the conditions in the first friction stir welding process S13 and the second friction stirring process S18, in order to suppress the influence due to the heat input so that friction stir welding can be performed under the same welding conditions, a cooling mechanism which cools the beveled part 6 may be provided in the friction stir welding apparatus 100. This cooling mechanism may be incorporated in the rotary tool 101 and the reaction force rotary tool 102, or may be provided as a mechanism separate from the rotary tool 101 and the reaction force rotary tool 102, and is not particularly limited.

In the second embodiment, the first stirring region E1 and the second stirring region E2 are formed by inverting the rotary tool 101 and the reaction force rotary tool 102, but this configuration is not particularly limited. The friction stirring tool 10 may be configured to include each of the first rotary tool and the first reaction force rotary tool which form the first stirring region E1, and the second rotary tool and the second reaction force rotary tool which form the second stirring region E2.

Figure 15:
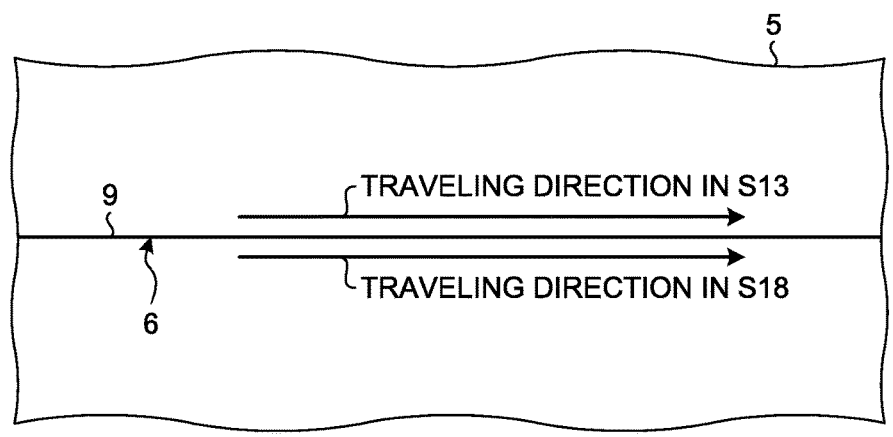
FIG. 15 is a plan view illustrating an advancing direction at the time of friction stir welding according to a second modified example of the second embodiment.

In the second embodiment, the advancing direction of the rotary tool 101 in the first friction stir welding process S13 is opposite to the advancing direction of the rotary tool 101 in the second friction stir welding process S18. However, a second modified example as illustrated in FIG. 15 may be adopted. FIG. 15 is a plan view illustrating an advancing direction at the time of friction stir welding according to a second modified example of the second embodiment. As illustrated in FIG. 15, in the second modified example, the advancing direction of the rotary tool 101 in the first friction stir welding process S13 is the same as the advancing direction of the rotary tool 101 in the second friction stir welding process S18.

Figure 16:
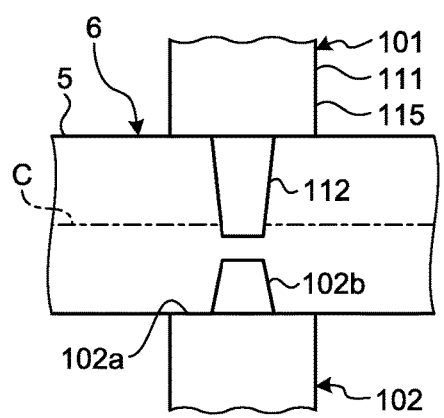
FIG. 16 is a schematic configuration diagram schematically illustrating a part of a friction stir welding apparatus according to a third modified example of the second embodiment.

In the second embodiment, the abutting surface 102a of the reaction force rotary tool 102 is a flat surface, but a third modified example illustrated in FIG. 16 may be adopted. FIG. 16 is a schematic configuration diagram schematically illustrating a part of a friction stir welding apparatus according to the third modified example of the second embodiment.

As illustrated in FIG. 16, in the reaction force rotary tool 102 according to the third modified example, a protruding portion 102b protruding from the abutting surface 102a is formed. The protruding portion 102b is formed to be shorter than the length of the probe 112 of the rotary tool 101 in the thickness direction and is formed to be shorter than half of the thickness of the beveled part 6. Therefore, a predetermined gap is formed between the probe 112 of the rotary tool 101 and the protruding portion 102b of the reaction force rotary tool 102.

As described above, according to the third modified example, the surface of the beveled part 6 on the side with which the abutting surface 102a abuts can be subjected to the friction stir welding by the protruding portion 102b. Therefore, for example, when performing the second friction stir welding process S18 after the first friction stir welding process S13, prior to friction stirring using the rotary tool 101 after inversion, it is possible to firmly and temporally weld the surface on the lower side of the beveled part 6 by the reaction force rotary tool 102, as compared to a case where there is no protrusion. For this reason, because it is possible to prevent opening of the lower side of the beveled part 6 by tack welding, it is possible to suitably frictionally stir the lower side of the beveled part 6 by the rotary tool 101 after inversion.

Figure 17:
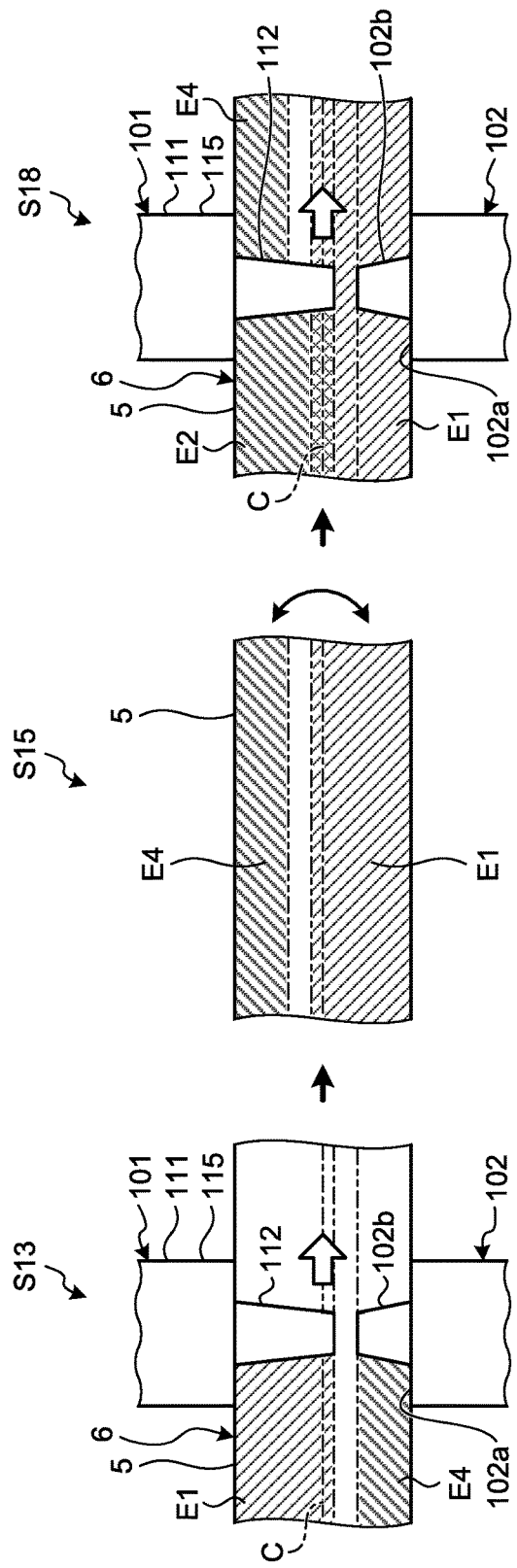
FIG. 17 is an explanatory view illustrating a friction stir welding operation performed by a friction stir welding apparatus according to a fourth modified example of the second embodiment.

In the second embodiment, the rotary tool 101 and the reaction force rotary tool 102 are inverted in position on both the upper and lower sides in the thickness direction across the beveled part 6 by the inverting mechanism 103, but a fourth modified example illustrated in FIG. 17 may be adopted. FIG. 17 is an explanatory view illustrating a friction stir welding operation performed by the friction stir welding apparatus according to the fourth modified example of the second embodiment. As illustrated in FIG. 17, in the fourth modified example, the pair of metal plates 5 is inverted in the thickness direction. Therefore, in the fourth modified example, in the first friction stir welding process S13, the first stirring region E1 is formed on the upper side of the beveled part 6, and after the pair of metal plates 5 is inverted, the second stirring region E2 is formed on the upper side of the beveled part 6 in the second friction stir welding process S18.

Here, the friction stir welding method according to the fourth modified example will be described with reference to FIG. 17. The fourth modified example illustrates a friction stir welding method provided by a combination of the second modified example and the third modified example. Since the friction stir welding method of the fourth modified example is different from the friction stir welding method of the second embodiment in the first friction stir welding process S13, the inverting process S15 and the second friction stir welding process S18, these processes will be described.

In the first friction stir welding process S13, the control unit 20 controls the first movement mechanism 13 and the second movement mechanism 14 to move the rotary tool 101 and the reaction force rotary tool 102 to the welding end point on the other tab plate 7 from the welding start point of one tab plate 7 through the welding line 9 (step S13: first friction stir welding process). At this time, because the rotary tool 101 is disposed on the upper side of the beveled part 6 in the thickness direction, in the first friction stir welding process S13, the first stirring region E1 is formed on the upper side of the beveled part 6. Further, because the reaction force rotary tool 102 is disposed on the lower side of the beveled part 6 in the thickness direction, in the first friction stir welding process S13, when the lower side of the beveled part 6 is subjected to friction stir welding by the protruding portion 102b, the tack welding and stirring region E4 is formed and temporarily welded.

In the inverting process (material inverting process) S15, the pair of metal plates 5 is inverted in the thickness direction thereof. By inverting the pair of metal plates 5, the lower side of the beveled part 6 becomes the first stirring region E1, and meanwhile, the upper side of the beveled part 6 becomes the tack welding and stirring region E4.

In the second friction stir welding process S18, the control unit 20 controls the first movement mechanism 13 and the second movement mechanism 14 to move the rotary tool 101 and the reaction force rotary tool 102 to the welding end point on the other tab plate 7 from the welding start point on the one tab plate 7 through the welding line 9 (step S18: second friction stir welding process). For this reason, the advancing direction of the rotary tool 101 in the second friction stir welding process S18 is the same advancing direction as the first friction stir welding process S13. At this time, since the rotary tool 101 is located on the upper side of the beveled part 6 in the thickness direction, in the second friction stir welding process S18, the second stirring region E2 is located on the upper side of the beveled part 6 to overlap the tack welding and stirring region E4. Further, because the reaction force rotary tool 102 is located on the lower side of the beveled part 6 in the thickness direction, in the second friction stir welding process S18, the lower side of the beveled part 6 is subjected to friction stir welding by the protruding portion 102b.

In this way, according to the fourth modified example, by inverting the pair of metal plates 5, the first stirring region E1 and the second stirring region E2 can be formed using the rotary tool 101 and the reaction force rotary tool 102. Therefore, it is possible to execute the first friction stir welding process S13 and the second friction stir welding process S18, by inverting the positions of the pair of metal plates 5, without inverting the positions of the rotary tool 101 and the reaction force rotary tool 102. Further, since the force necessary for rotation is lower in the reaction force rotary tool 102 than in the rotary tool 101, it is also possible to reduce the output of the motor that is rotationally driven.

Third Embodiment

Figure 18:
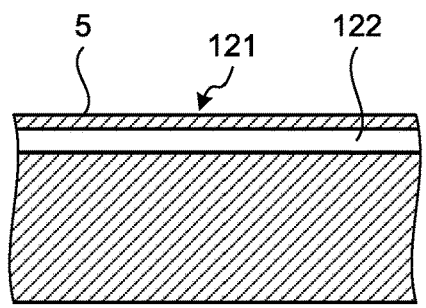
FIG. 18 is an explanatory view of a welding part repaired by a friction stir welding apparatus according to a third embodiment.
Figure 19:
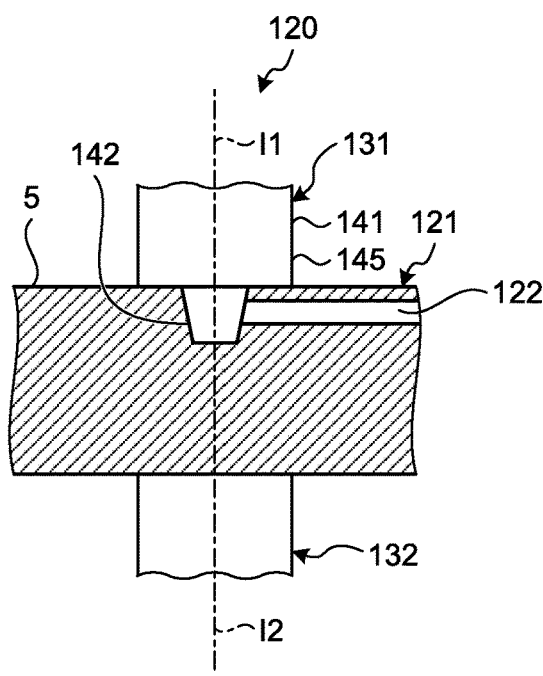
FIG. 19 is an explanatory view illustrating a repairing operation performed by the friction stir welding apparatus according to the third embodiment.

Next, a friction stir welding apparatus 120 according to a third embodiment will be described with reference to FIGS. 18 and 19. FIG. 18 is an explanatory view of a welding part repaired by the friction stir welding apparatus according to the third embodiment. FIG. 19 is an explanatory view illustrating a repairing operation performed by the friction stir welding apparatus according to the third embodiment. In the third embodiment, in order to avoid repeated description, parts different from those of the first and second embodiments will be described, and the portions having the same configurations as those of the first and second embodiments are denoted by the same reference numerals. The friction stir welding apparatus 120 according to the third embodiment has a configuration which is capable of repairing a welding defect part 122 generated in a welding part 121 which is the beveled part 6 subjected to the friction stir welding in the first and second embodiments. Prior to the description of the friction stir welding apparatus 120 according to the third embodiment, the welding defect part 122 will be described below.

As illustrated in FIG. 18, in the welding part 121 subjected to the friction stir welding, the welding defect part 122 which is a non-welded part of the pair of metal plates 5 is formed in a predetermined range in the thickness direction, and the welding defect part 122 is formed over the advancing direction. That is, the welding defect part 122 is formed inside the welding part 121, and is formed to extend in the advancing direction, without changing the height in the thickness direction.

In the friction stir welding apparatus 120 which repairs the welding defect part 122 illustrated in FIG. 18, as illustrated in FIG. 19, the friction stirring tool 10 has a repairing rotary tool 131 and a reaction force rotary tool 132.

The repairing rotary tool 131 is disposed on the side on which the welding defect part 122 is formed across the welding part 121. The repairing rotary tool 131 rotates about the first rotary axis I1 and is pressed against the surface (upper surface of FIG. 19) on one side of the welding part 121.

The reaction force rotary tool 132 is disposed on the opposite side of the repairing rotary tool 131 across the welding part 121, similarly to the reaction force rotary tool 102 of the second embodiment. The reaction force rotary tool 132 rotates about the second rotary axis I2 and is pressed against the other surface (the lower surface in FIG. 19) of the welding part 121 opposite to the repairing rotary tool 131.

Further, the first rotary axis I1 of the repairing rotary tool 131 and the second rotary axis I2 of the reaction force rotary tool 132 are provided coaxially along the vertical direction. Hereinafter, the repairing rotary tool 131 and the reaction force rotary tool 132 will be described. Because the reaction force rotary tool 132 has the same configuration as the reaction force rotary tool 102 of the second embodiment, the description thereof will not be provided.

The repairing rotary tool 131 has a tool body 141 and a probe 142. The tool body 141 is formed in a cylindrical shape, and a shoulder part 145 is formed on the front end side which is the reaction force rotary tool 132 side. The probe 142 is provided to protrude toward the front end side from the shoulder part 145 of the tool body 141. The length of the probe 142 of the welding part 121 in the thickness direction reaches the interior of the welding part 121 from the surface on one side of the welding part 121, and covers the welding defect part 122. Specifically, the length of the probe 142 of the welding part 121 in the thickness direction is formed to be shorter than half of the thickness of the welding part 121.

The repairing rotary tool 131 is connected to the first pressing rotary mechanism 11 and is moved by the first movement mechanism 13. Further, the reaction force rotary tool 132 is connected to the second pressing rotary mechanism 12 and is moved by the second movement mechanism 14.

When repairing the welding part 121 using the friction stir welding apparatus 120, the control unit 20 controls the first pressing rotary mechanism 11 to press the repairing rotary tool 131 against on the one surface of the welding part 121 as the side on which the welding defect part 122 is formed. Further, the control unit 20 controls the second pressing rotary mechanism 12 to press the reaction force rotary tool 132 against the other surface of the welding part 121 which is the opposite side of the repairing rotary tool 131. Further, even when performing the repair, a tab plate having a bottomed hole formed thereon may be used as in the first and second embodiments. At this time, the control unit 20 controls the first pressing rotary mechanism 11 and the second pressing rotary mechanism 12 such that the load applied to the welding part 121 becomes a predetermined load, while controlling the positions of the repairing rotary tool 131 and the reaction force rotary tool 132 in the thickness direction. Further, the control unit 20 controls the first movement mechanism 13 and the second movement mechanism 14 to move the repairing rotary tool 131 and the reaction force rotary tool 132 in the direction in which the welding part 121 is formed as the advancing direction. At this time, because the probe 142 has a length which covers the welding defect part 122 in the thickness direction, the repairing rotary tool 131 can perform the friction stir welding of the welding defect part 122 in the thickness direction and can perform the friction stir welding of the welding defect part 122 over the advancing direction.

As described above, according to the third embodiment, it is possible to repair the welding defect part 122 generated in the welding part 121, using the repairing rotary tool 131 and the reaction force rotary tool 132. At this time, by imparting a reaction force to the repairing rotary tool 131, the reaction force rotary tool 132 can suppress the positional variation of the welding part 121 in the thickness direction and can impart heat input due to rotation to the welding part 121.

Fourth Embodiment

Figure 20:
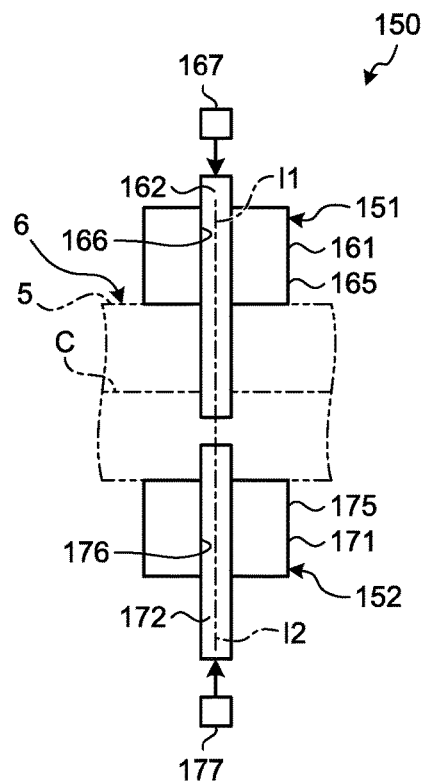
FIG. 20 is a schematic configuration diagram schematically illustrating a part of a friction stir welding apparatus according to a fourth embodiment.
Figure 21:
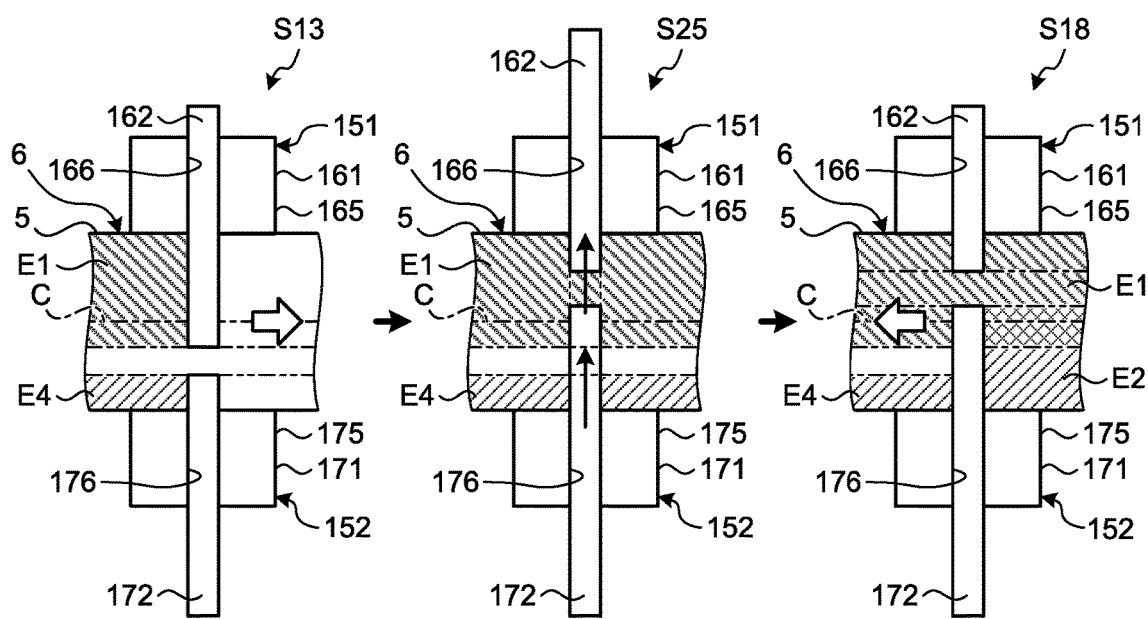
FIG. 21 is an explanatory view illustrating a friction stir welding operation performed by the friction stir welding apparatus according to the fourth embodiment.

Next, a friction stir welding apparatus 150 according to a fourth embodiment will be described with reference to FIGS. 20 and 21. FIG. 20 is a schematic configuration diagram schematically illustrating a part of a friction stir welding apparatus according to the fourth embodiment. FIG. 21 is an explanatory view illustrating the friction stir welding operation performed by the friction stir welding apparatus according to the fourth embodiment. In the fourth embodiment, in order to avoid repeated description, parts different from the first to third embodiments will be described, and the parts having the same configurations as those of the first to third embodiments are denoted by the same reference numerals. In the friction stir welding apparatus 100 according to the second embodiment, the first stirring region E1 and the second stirring region E2 were formed by inverting the rotary tool 101 and the reaction force rotary tool 102 using the inverting mechanism 103. In the friction stir welding apparatus 150 according to the fourth embodiment, the first stirring region E1 and the second stirring region E2 are formed by causing a first probe pin 162 and a second probe pin 172 provided in each of a rotary tool 151 and a reaction force rotary tool 152 to appropriately protrude and retract. Hereinafter, the friction stir welding apparatus 150 according to the fourth embodiment will be described.

As illustrated in FIG. 20, in the friction stir welding apparatus 150 according to the fourth embodiment, the friction stirring tool 10 has a rotary tool 151 and a reaction force rotary tool 152. The rotary tool 151 and the reaction force rotary tool 152 are disposed on both sides in the thickness direction across the beveled part 6. The rotary tool 151 rotates about the first rotary axis I1, the reaction force rotary tool 152 rotates about the second rotary axis I2, and the first rotary axis I1 and the second rotary axis I2 are coaxial with each other.

The rotary tool 151 has a first tool body 161 and a first probe pin 162. The first tool body 161 is formed in a cylindrical shape, and a first shoulder part 165 is formed on the front end side which is the side of the reaction force rotary tool 152. The first tool body 161 is provided with a first insertion hole 166 which is formed to penetrate along the first rotary axis I1.

The first insertion hole 166 is a hole into which the first probe pin 162 is inserted. The first insertion hole 166 is formed to penetrate through the entire length of the first tool body 161. The first insertion hole 166 has a circular cross section taken along a plane orthogonal to the first rotary axis I1, and is formed in a hollow cylindrical shape having the first rotary axis I1 as a central axis.

The first probe pin 162 is rotatably inserted through the first insertion hole 166 of the rotary tool 151 and is freely movable in the axial direction of the first rotary axis I1. The first probe pin 162 is formed in a cylindrical shape having a circular cross section. A portion of the first probe pin 162 on the front end side protrudes from the first insertion hole 166. Further, the first probe pin 162 may rotate in synchronization with the first tool body 161 or may rotate independently of the first tool body 161, and is not particularly limited.

The first probe pin 162 is connected with a first axis movement rotary mechanism 167 which moves inside the first insertion hole 166 in the axial direction and rotates the first probe pin 162. The first axis movement rotary mechanism 167 is connected to the control unit 20, and when the first axis movement rotary mechanism 167 is controlled by the control unit 20, the movement and rotation of the first probe pin 162 in the axial direction are controlled.

The reaction force rotary tool 152 has the same configuration as the rotary tool 151, and has a second tool body 171 and a second probe pin 172. The second tool body 171 is similar to the first tool body 161. In the second tool body 171, a second shoulder part 175 similar to the first shoulder part 165 is formed, and a second insertion hole 176 similar to the first insertion hole 166 is formed. The second probe pin 172 is similar to the first probe pin 162, and is moved and rotated in the axial direction by a second axis movement rotary mechanism 177.

Here, the rotary tool 151 functions as a rotary tool (first rotary tool) that forms the first stirring region E1 or functions as a reaction force rotary tool (second reaction force rotary tool) that imparts the reaction force to the rotary tool which forms the second stirring region E2, depending on the protruding length of the first probe pin 162. Further, the reaction force rotary tool 152 functions as a reaction force rotary tool (first reaction force rotary tool) that imparts the reaction force to the rotary tool which forms the first stirring region E1, or functions as a rotary tool (second rotary tool) that forms the second stirring region E2, depending on the protruding length of the second probe pin 172. That is, the rotary tool 151 can operate as a reaction force rotary tool, and the reaction force rotary tool 152 can operate as a rotary tool.

When forming the first stirring region E1, the rotary tool 151 sets the protruding length of the first probe pin 162 to be longer than the protruding length of the second probe pin 172 of the reaction force rotary tool 152. Specifically, the first probe pin 162 protrudes from the first shoulder part 165 so that the length of the beveled part 6 in the thickness direction is longer than half of the thickness of the beveled part 6. At this time, since the first rotary axis I1 of the rotary tool 151 and the second rotary axis I2 of the reaction force rotary tool 152 are coaxial with each other, a predetermined gap is formed between the first probe pin 162 and the second probe pin 172. Therefore, the second probe pin 172 protrudes from the second shoulder part 175 so that the length in the thickness direction of the beveled part 6 is shorter than half of the thickness of the beveled part 6.

On the other hand, when forming the second stirring region E2, the rotary tool 151 sets the protruding length of the first probe pin 162 to be shorter than the protruding length of the second probe pin 172 of the reaction force rotary tool 152. Specifically, the first probe pin 162 protrudes from the first shoulder part 165 so that the length of the beveled part 6 in the thickness direction is shorter than half of the thickness of the beveled part 6, thereby allowing the rotary tool 151 to function as the reaction force rotary tool. The second probe pin 172 protrudes from the second shoulder part 175 so that the length of the beveled part 6 in the thickness direction is longer than half of the thickness of the beveled part 6, thereby allowing the reaction force rotary tool 152 to function as the rotary tool.

Therefore, the rotary tool 151 at the time of forming the first stirring region E1 and the reaction force rotary tool 152 at the time of forming the second stirring region E2 overlap each other inside the beveled part 6 in the thickness direction of the beveled part 6.

Here, the friction stir welding method according to the fourth embodiment will be described with reference to FIG. 21. The friction stir welding method of the fourth embodiment is different from the first friction stir welding process S13 and the second friction stir welding process S18 of the second embodiment, and performs a replacing process S25 in place of the inverting process S15 of the second embodiment. Accordingly, these processes will be described.

In the first friction stir welding process S13, the control unit 20 controls the first movement mechanism 13 and the second movement mechanism 14 to move the rotary tool 151 and the reaction force rotary tool 152 to the welding end point on the other tab plate 7 from the welding start point of one tab plate 7 through the welding line 9 (step S13: first friction stir welding process). At this time, because the rotary tool 151 is disposed on the upper side in the thickness direction of the beveled part 6 and the first probe pin 162 is longer than the second probe pin 172, in the first friction stir welding process S13, a first stirring region E1 is formed on the upper side of the beveled part 6. Further, because the reaction force rotary tool 152 is disposed on the lower side of the beveled part 6 in the thickness direction and the second probe pin 172 is shorter than the first probe pin 162, in the first friction stir welding process S13, when the lower side of the beveled part 6 is subjected to the friction stir welding, the tack welding and stirring region E4 is formed and is temporarily welded.

In the replacing process S25, the control unit 20 controls the first axis movement rotary mechanism 167 and the second axis movement rotary mechanism 177 to displace the protruding length of the first probe pin 162 and the protruding length of the second probe pin 172 and to set the protruding length of the second probe pin 172 to be longer than that of the first probe pin 162. Therefore, in the replacing process S25, the rotary tool 151 is used as a reaction force rotary tool, and the reaction force rotary tool 152 is used as the rotary tool. Further, in the replacing process S25, because the protruding lengths of the first probe pin 162 and the second probe pin 172 can be displaced, without pulling out the rotary tool 151 and the reaction force rotary tool 152 from the beveled part 6, it is possible to omit the drawing-out process S14 of the second embodiment.

In the second friction stir welding process S18, the control unit 20 controls the first movement mechanism 13 and the second movement mechanism 14 to move the rotary tool 151 and the reaction force rotary tool 152 to the welding end point on one tab plate 7 from the welding start point of the other tab plate 7 through the welding line 9 (step S18: second friction stir welding process). Therefore, the advancing directions of the rotary tool 151 and the reaction force rotary tool 152 in the first friction stir welding process S13 are set to be opposite to the advancing directions of the rotary tool 151 and the reaction force rotary tool 152 in the second friction stir welding process S18. At this time, because the reaction force rotary tool 152 is disposed on the lower side of the beveled part 6 in the thickness direction and the second probe pin 172 is longer than the first probe pin 162, in the second friction stir welding process S18, the second stirring region E2 is formed to overlap the tack welding and stirring region E4 on the lower side of the beveled part 6. Further, because the rotary tool 151 is disposed on the upper side in the thickness direction of the beveled part 6 and the first probe pin 162 is shorter than the second probe pin 172, in the second friction stir welding process S18, the upper side of the beveled part 6 is subjected to friction stir welding.

As described above, according to the fourth embodiment, by displacing each of the protruding length of the first probe pin 162 and the protruding length of the second probe pin 172 in the replacing process S25, the rotary tool 151 can be used as the reaction force rotary tool, and the reaction force rotary tool 152 can be used as the rotary tool. At this time, since it is not necessary to pull out the rotary tool 151 and the reaction force rotary tool 152, the working process can be shortened.

When forming the first stirring region E1, the second probe pin 172 may not protrude from the second shoulder part 175. Similarly, when forming the second stirring region E2, the first probe pin 162 may not protrude from the first shoulder part 165.

Further, the front end of the first probe pin 162 exposed from the first shoulder part 165 may have a tapered shape, and the second probe pin 172 may also have a tapered shape, like the first probe pin 162.

REFERENCE SIGNS LIST

1 FRICTION STIR WELDING APPARATUS
5 METAL PLATE
6 BEVELED PART
7 TAB PLATE
8a, 8b BOTTOMED HOLE
9 WELDING LINE
10 FRICTION STIRRING TOOL
11 FIRST PRESSING ROTARY MECHANISM
12 SECOND PRESSING ROTARY MECHANISM
13 FIRST MOVEMENT MECHANISM
14 SECOND MOVEMENT MECHANISM
16 TOOL LOAD DETECTOR
20 CONTROL UNIT
21 FIRST ROTARY TOOL
22 SECOND ROTARY TOOL
31 FIRST TOOL BODY
32 FIRST PROBE
32a FIRST FRONT END SURFACE
35 FIRST SHOULDER PART
35a FIRST SHOULDER SURFACE
36 RECESSED PORTION
41 SECOND TOOL BODY
42 SECOND PROBE
42a SECOND FRONT END SURFACE
45 SECOND SHOULDER PART
45a SECOND SHOULDER SURFACE
51 FIRST MOTOR LOAD DETECTOR
52 SECOND MOTOR LOAD DETECTOR
100 FRICTION STIR WELDING APPARATUS
101 ROTARY TOOL
102 REACTION FORCE ROTARY TOOL
102a ABUTTING SURFACE
102b PROTRUDING PORTION
103 INVERTING MECHANISM
111 TOOL BODY
112 PROBE

115 SHOULDER PART
120 FRICTION STIR WELDING APPARATUS
121 WELDING PART
122 WELDING DEFECT PART
131 REPAIRING ROTARY TOOL
132 REACTION FORCE ROTARY TOOL
141 TOOL BODY
142 PROBE
145 SHOULDER PART
150 FRICTION STIR WELDING APPARATUS
151 ROTARY TOOL
152 REACTION FORCE ROTARY TOOL
161 FIRST TOOL BODY
162 FIRST PROBE PIN
165 FIRST SHOULDER PART
166 FIRST INSERTION HOLE
167 FIRST AXIS MOVEMENT ROTARY MECHANISM
171 SECOND TOOL BODY
172 SECOND PROBE PIN
175 SECOND SHOULDER PART
176 SECOND INSERTION HOLE
177 SECOND AXIS MOVEMENT ROTARY MECHANISM
C LINE
I1 FIRST ROTARY AXIS
I2 SECOND ROTARY AXIS

The invention claimed is:

1. A friction stir welding method comprising:
a first friction stir welding process of forming a first stirring region in a welded part of a metallic material, by moving a first rotary tool in a first advancing direction while rotating the first rotary tool, the first rotary tool being disposed on one side of the welded part in a thickness direction across the welded part; and
a second friction stir welding process of forming a second stirring region in the welded part, by moving a second rotary tool in a second advancing direction while rotating the second rotary tool, simultaneously with the first friction stir welding process, the second rotary tool being disposed on the other side of the welded part in the thickness direction across the welded part, wherein:
the first stirring region is a region which reaches an interior of the welded part from the one side of the welded part in the thickness direction, the second stirring region is a region which reaches an interior of the welded part from the other side of the welded part in the thickness direction, the first stirring region and the second stirring region overlap each other inside the welded part in the thickness direction, a first rotary axis of the first rotary tool and a second rotary axis of the second rotary tool are provided in parallel, and the first rotary tool and the second rotary tool are configured to he shifted left and right orthogonal to the thickness direction,
wherein the first rotary tool includes: a first tool body having a first shoulder part which is in contact with one surface of the welded part, and a first probe protruding from the first tool body toward the second rotary tool, wherein the second rotary tool includes: a second tool body having a second shoulder part which is in contact with the other surface of the welded part, and a second probe protruding from the second tool body toward the first rotary tool, and wherein the first rotary tool and the second rotary tool are configured to be shifted in a range in which at least a part of the first shoulder part and the second shoulder part overlap each other in the thickness direction;
wherein the first rotary tool is configured to rotate about the first rotary axis, the first shoulder part has an outer circumferential surface, the first probe has a circular first front end surface on a front end side that is a second rotary tool side, the second rotary tool is configured to rotate about the second rotary axis, the second shoulder part has an outer circumferential surface, the second probe has a circular second from end surface on a front end side that is a first rotary tool side,
a distance between the first rotary axis and the second rotary axis is defined as L, a diameter of the first shoulder part is defined as D1, a diameter of the first front end surface is defined as d1, a diameter of the second shoulder part is defined as D2, and a diameter of the second front end surface is set defined as d2,
in a case where (D1/2+d2/2)≤(D2/2+d1/2), the first rotary tool and the second rotary tool are configured to be shifted so that the distance L is in a range of (d1/2+d2/2)<L<(D1/2+d2/2), and
in a case where (D1/2+d2/2)>(D2/2+d1/2), the first rotary tool and the second rotary tool are configured to be shifted so that the distance L is in a range, of(d1/2+d2/2)<L<(D2/2+d1/2).

2. The friction stir welding method according to claim 1, wherein:
the welded part is a beveled part formed by making a pair of metallic materials butt against each other,
the beveled part forms a welding line extending from a welding start point toward a welding end point, and
the first rotary tool and the second rotary tool are configured to move on the welding line.

3. The friction stir welding method according to claim 1, wherein:
the first advancing direction and the second advancing direction are in a same advancing direction,
the first rotary tool is formed to have a length in the thickness direction which reaches the interior of the welded part from the one side of the welded part,
the second rotary tool is formed to have a length in the thickness direction which reaches the interior of the welded part from the other side of the welded part, and
the first rotary tool and the second rotary tool overlap each other inside the welded part in the thickness direction and are configured to be at least shifted front and rear in the same advancing direction.

4. The friction stir welding method according to claim 1, wherein, when the first rotary tool and the second rotary tool are viewed from one side in the thickness direction, a rotary direction of the first rotary tool and a rotary direction of the second rotary tool are opposite to each other.

5. The friction stir welding method according to claim 1, wherein the first rotary tool and the second rotary tool have a same shape.

6. A friction stir welding method comprising:
a first friction stir welding process of forming a first stirring region in a welded part of a metallic material, by moving a first rotary tool in a first advancing direction while rotating the first rotary tool, the first rotary tool being disposed on one side of the welded part in a thickness direction across the welded part; and
a second friction stir welding process of forming a second stirring region in the welded part, by moving a second rotary tool in a second advancing direction while rotating the second rotary tool, simultaneously with the first friction stir welding process or after performing the first friction stir welding process, the second rotary tool being disposed on the other side of the welded part in the thickness direction across the welded part, wherein:

the first stirring region is a region which reaches an interior of the welded part from the one side of the welded part in the thickness direction, the second stirring region is a region which reaches the interior of the welded part from the other side of the welded part in the thickness direction, the first stirring region and the second stirring region overlap each other inside the welded part in the thickness direction, when performing the second friction stir welding process after performing the first friction stir welding process, in the first friction stir welding process, a first reaction force rotary tool is provided on an opposite side of the first rotary tool across the welded part, the first reaction force rotary tool having a first abutting surface which abuts against the other side of the welded part in the thickness direction, and imparting a reaction force to the first rotary tool, and in the second friction stir welding process, a second reaction force rotary tool is provided on the opposite side of the second rotary tool across the welded part, the second reaction force rotary tool having a second abutting surface which abuts against the one side of the welded part in the thickness direction, and imparting a reaction force to the second rotary tool, wherein the first rotary tool has:

a first tool body having a first shoulder part which is in contact with one surface of the welded part, a first insertion hole formed to penetrate the first tool body along a first rotary axis of the first rotary tool, and a first probe pin which is inserted through the first insertion hole, is movable in an axial direction of the first rotary axis and protrudes toward the first reaction force rotary tool from the first tool body, wherein the first reaction force rotary tool has:

a second tool body having a second shoulder part which is in contact with the other surface of the welded part, a second insertion hole formed to penetrate the second tool body along a second rotary axis of the first reaction force rotary tool, and a second probe pin which is inserted through the second insertion hole, is movable in the axial direction of the second rotary axis and protrudes toward the first rotary tool from the second tool body, in the first friction stir welding process, the first rotary tool and the first reaction force rotary tool are disposed such that the first rotary axis and the second rotary axis are coaxial with each other, the first probe pin and the second probe pin are opposed to each other with a predetermined gap therebetween, and a protruding length of the first probe pin is set to be longer than a length of the second probe pin, and wherein the method further comprises:

after performing the first friction stir welding process, a replacing process of setting the first rotary tool as the second reaction force rotary tool and setting the first reaction force rotary tool as the second rotary tool, by displacing the protruding length of the first probe pin of the first rotary tool and a protruding length of the second probe pin of the first reaction force rotary tool to set the protruding length of the second probe pin to be longer than the first probe pin.

7. The friction stir welding method according to claim 6, wherein, after performing the first friction stir welding process, the second friction stir welding process is performed in a state of keeping a position of the metallic material.

8. The friction stir welding method according to claim 6, wherein, when the thickness direction of the welded part is a vertical direction, in the first friction stir welding process, the first rotary tool is disposed on an upper side of the welded part.

9. The friction stir welding method according to claim 6, wherein the first advancing direction and the second advancing direction are opposite to each other.

10. The friction stir welding method according to claim 1, wherein, in the event of any defect:

the welding part is repaired, by moving a repairing rotary tool disposed on the one side of the welding part in the thickness direction across the welding part, and a reaction force rotary tool disposed on the other side of the welding part in the thickness direction across the welding part to impart a reaction force to the repairing rotary tool in a predetermined advancing direction, while rotating the repairing rotary tool and the reaction force rotary tool, and a length of the repairing rotary tool in the thickness direction reaches the interior of the welding part from the one side of the welding part and covers the defect.

\* \* \* \* \*